(12) United States Patent
Bjorstrom et al.

(10) Patent No.: US 8,792,214 B1
(45) Date of Patent: Jul. 29, 2014

(54) ELECTRICAL CONTACTS TO MOTORS IN DUAL STAGE ACTUATED SUSPENSIONS

(71) Applicant: Hutchinson Technology Incorporated, Hutchinson, MN (US)

(72) Inventors: Jacob D. Bjorstrom, Hutchinson, MN (US); Nole D. German, Hutchinson, MN (US); Paul V. Pesavento, Hutchinson, MN (US); Zachary A. Pokornowski, Cokato, MN (US); Ryan N. Ruzicka, Dassel, MN (US); Kurt C. Swanson, Hutchinson, MN (US); Allan D. Tokuda, Minneapolis, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 14/103,955

(22) Filed: Dec. 12, 2013

Related U.S. Application Data

(60) Provisional application No. 61/857,434, filed on Jul. 23, 2013.

(51) Int. Cl.
*G11B 5/48* (2006.01)
(52) U.S. Cl.
USPC .................................................. 360/245.8
(58) Field of Classification Search
USPC .................................................. 360/245.8
See application file for complete search history.

(56) References Cited

U.S. PATENT DOCUMENTS

| | | | |
|---|---|---|---|
| 3,320,556 A | 5/1967 | Schneider | |
| 4,418,239 A | 11/1983 | Larson et al. | |
| 5,140,288 A | 8/1992 | Grunwell | |
| 5,321,568 A | 6/1994 | Hatam-Tabrizi | |
| 5,333,085 A | 7/1994 | Prentice et al. | |
| 5,427,848 A | 6/1995 | Baer et al. | |
| 5,459,921 A | 10/1995 | Hudson et al. | |
| 5,598,307 A | 1/1997 | Bennin | |
| 5,608,591 A | 3/1997 | Klaassen | |

(Continued)

FOREIGN PATENT DOCUMENTS

| | | | |
|---|---|---|---|
| EP | 0591954 B1 | 4/1994 | |
| EP | 0834867 B1 | 5/2007 | |

(Continued)

OTHER PUBLICATIONS

International Search Report and Written Opinion issued in PCT/US2013/031484, mailed May 30, 2013, 13 pages.

(Continued)

*Primary Examiner* — Mark Blouin
(74) *Attorney, Agent, or Firm* — Faegre Baker Daniels LLP

(57) ABSTRACT

Various embodiments concern a dual stage actuation flexure having a motor contact paddle for connecting to a terminal of a piezoelectric motor. The flexure comprises a paddle having a top side and a bottom side, the paddle comprising at least one void, each void extending through the paddle from the bottom side to the top side. The paddle further comprises a stainless steel base, a conductor comprising a layer of metal, and a dielectric layer having a first section and a second section, the first section positioned between the conductor and the stainless steel base to overlap the stainless steel base and the second section extending beyond the stainless steel base to not overlap the stainless steel base. The bottom side of the paddle is configured to connect to the terminal with electrically conductive adhesive.

30 Claims, 25 Drawing Sheets

(56) References Cited

U.S. PATENT DOCUMENTS

| | | |
|---|---|---|
| 5,631,786 A | 5/1997 | Erpelding |
| 5,636,089 A | 6/1997 | Jurgenson et al. |
| 5,657,188 A | 8/1997 | Jurgenson et al. |
| 5,666,241 A | 9/1997 | Summers |
| 5,666,717 A | 9/1997 | Matsumoto et al. |
| 5,694,270 A | 12/1997 | Sone et al. |
| 5,717,547 A | 2/1998 | Young |
| 5,734,526 A | 3/1998 | Symons |
| 5,737,152 A | 4/1998 | Balakrishnan |
| 5,764,444 A | 6/1998 | Imamura et al. |
| 5,790,347 A | 8/1998 | Girard |
| 5,796,552 A | 8/1998 | Akin, Jr. et al. |
| 5,805,382 A | 9/1998 | Lee et al. |
| 5,812,344 A | 9/1998 | Balakrishnan |
| 5,862,010 A | 1/1999 | Simmons et al. |
| 5,892,637 A | 4/1999 | Brooks, Jr. et al. |
| 5,921,131 A | 7/1999 | Stange |
| 5,924,187 A | 7/1999 | Matz |
| 5,973,884 A | 10/1999 | Hagen |
| 5,986,853 A | 11/1999 | Simmons et al. |
| 5,995,328 A | 11/1999 | Balakrishnan |
| 6,011,671 A | 1/2000 | Masse et al. |
| 6,038,102 A | 3/2000 | Balakrishnan et al. |
| 6,055,132 A | 4/2000 | Arya et al. |
| 6,075,676 A | 6/2000 | Hiraoka et al. |
| 6,078,470 A | 6/2000 | Danielson et al. |
| 6,108,175 A | 8/2000 | Hawwa et al. |
| 6,118,637 A | 9/2000 | Wright et al. |
| 6,144,531 A | 11/2000 | Sawai |
| 6,146,813 A | 11/2000 | Girard et al. |
| 6,157,522 A | 12/2000 | Murphy et al. |
| 6,172,853 B1 | 1/2001 | Davis et al. |
| 6,246,546 B1 | 6/2001 | Tangren |
| 6,246,552 B1 | 6/2001 | Soeno et al. |
| 6,275,358 B1 | 8/2001 | Balakrishnan et al. |
| 6,278,587 B1 | 8/2001 | Mei |
| 6,282,062 B1 | 8/2001 | Shiraishi |
| 6,297,936 B1 | 10/2001 | Kant et al. |
| 6,300,846 B1 | 10/2001 | Brunker |
| 6,320,730 B1 | 11/2001 | Stefansky et al. |
| 6,331,347 B2 | 12/2001 | Haji |
| 6,376,964 B1 | 4/2002 | Young et al. |
| 6,396,667 B1 | 5/2002 | Zhang et al. |
| 6,399,899 B1 | 6/2002 | Ohkawa et al. |
| 6,400,532 B1 | 6/2002 | Mei |
| 6,404,594 B1 | 6/2002 | Maruyama et al. |
| 6,424,500 B1 | 7/2002 | Coon et al. |
| 6,445,546 B1 | 9/2002 | Coon |
| 6,493,190 B1 | 12/2002 | Coon |
| 6,493,192 B2 | 12/2002 | Crane et al. |
| 6,549,736 B2 | 4/2003 | Miyabe et al. |
| 6,596,184 B1 | 7/2003 | Shum et al. |
| 6,597,541 B2 | 7/2003 | Nishida et al. |
| 6,621,653 B1 | 9/2003 | Schirle |
| 6,636,388 B2 | 10/2003 | Stefansky |
| 6,639,761 B1 | 10/2003 | Boutaghou et al. |
| 6,661,618 B2 | 12/2003 | Fujiwara et al. |
| 6,704,157 B2 | 3/2004 | Himes et al. |
| 6,704,158 B2 | 3/2004 | Hawwa et al. |
| 6,714,384 B2 | 3/2004 | Himes et al. |
| 6,714,385 B1 | 3/2004 | Even et al. |
| 6,728,057 B2 | 4/2004 | Putnam |
| 6,728,077 B1 | 4/2004 | Murphy |
| 6,735,055 B2 | 5/2004 | Crane et al. |
| 6,737,931 B2 | 5/2004 | Amparan et al. |
| 6,738,225 B1 | 5/2004 | Summers et al. |
| 6,741,424 B1 | 5/2004 | Danielson et al. |
| 6,760,196 B1 | 7/2004 | Niu et al. |
| 6,762,913 B1 | 7/2004 | Even et al. |
| 6,765,761 B2 | 7/2004 | Arya |
| 6,791,802 B2 | 9/2004 | Watanabe et al. |
| 6,798,597 B1 | 9/2004 | Aram et al. |
| 6,801,402 B1 | 10/2004 | Subrahmanyam et al. |
| 6,839,204 B2 | 1/2005 | Shiraishi et al. |
| 6,841,737 B2 | 1/2005 | Komatsubara et al. |
| 6,898,042 B2 | 5/2005 | Subrahmanyan |
| 6,900,967 B1 | 5/2005 | Coon et al. |
| 6,922,305 B2 | 7/2005 | Price |
| 6,934,127 B2 | 8/2005 | Yao et al. |
| 6,942,817 B2 | 9/2005 | Yagi et al. |
| 6,943,991 B2 | 9/2005 | Yao et al. |
| 6,963,471 B2 | 11/2005 | Arai et al. |
| 6,975,488 B1 | 12/2005 | Kulangara et al. |
| 6,977,790 B1 | 12/2005 | Chen et al. |
| 7,006,333 B1 | 2/2006 | Summers |
| 7,016,159 B1 | 3/2006 | Bjorstrom et al. |
| 7,020,949 B2 | 4/2006 | Muramatsu et al. |
| 7,023,667 B2 | 4/2006 | Shum |
| 7,050,267 B2 | 5/2006 | Koh et al. |
| 7,057,857 B1 | 6/2006 | Niu et al. |
| 7,079,357 B1 | 7/2006 | Kulangara et al. |
| 7,082,670 B2 | 8/2006 | Boismier et al. |
| 7,092,215 B2 | 8/2006 | Someya et al. |
| 7,132,607 B2 | 11/2006 | Yoshimi et al. |
| 7,142,395 B2 | 11/2006 | Swanson et al. |
| 7,144,687 B2 | 12/2006 | Fujisaki et al. |
| 7,159,300 B2 | 1/2007 | Yao et al. |
| 7,161,767 B2 | 1/2007 | Hernandez et al. |
| 7,256,968 B1 | 8/2007 | Krinke |
| 7,271,958 B2 | 9/2007 | Yoon et al. |
| 7,336,436 B2 | 2/2008 | Sharma et al. |
| 7,342,750 B2 | 3/2008 | Yang et al. |
| 7,345,851 B2 | 3/2008 | Hirano et al. |
| 7,375,930 B2 | 5/2008 | Yang et al. |
| 7,379,274 B2 | 5/2008 | Yao et al. |
| 7,382,582 B1 | 6/2008 | Cuevas |
| 7,388,733 B2 | 6/2008 | Swanson |
| 7,408,745 B2 | 8/2008 | Yao et al. |
| 7,417,830 B1 | 8/2008 | Kulangara |
| 7,460,337 B1 | 12/2008 | Mei |
| 7,466,520 B2 | 12/2008 | White et al. |
| 7,499,246 B2 | 3/2009 | Nakagawa |
| 7,595,965 B1 | 9/2009 | Kulangara et al. |
| 7,643,252 B2 | 1/2010 | Arai et al. |
| 7,667,921 B2 | 2/2010 | Satoh et al. |
| 7,675,713 B2 | 3/2010 | Ogawa et al. |
| 7,688,552 B2 | 3/2010 | Yao et al. |
| 7,692,899 B2 | 4/2010 | Arai et al. |
| 7,701,673 B2 | 4/2010 | Wang et al. |
| 7,701,674 B2 | 4/2010 | Arai |
| 7,719,798 B2 | 5/2010 | Yao |
| 7,724,478 B2 | 5/2010 | Deguchi et al. |
| 7,751,153 B1 | 7/2010 | Kulangara et al. |
| 7,768,746 B2 | 8/2010 | Yao et al. |
| 7,782,572 B2 | 8/2010 | Pro |
| 7,821,742 B1 | 10/2010 | Mei |
| 7,835,113 B1 | 11/2010 | Douglas |
| 7,875,804 B1 | 1/2011 | Tronnes et al. |
| 7,923,644 B2 | 4/2011 | Ishii et al. |
| 7,924,530 B1 | 4/2011 | Chocholaty |
| 7,983,008 B2 | 7/2011 | Liao et al. |
| 7,986,494 B2 | 7/2011 | Pro |
| 8,004,798 B1 | 8/2011 | Dunn |
| 8,085,508 B2 | 12/2011 | Hatch |
| 8,089,728 B2 | 1/2012 | Yao et al. |
| 8,120,878 B1 | 2/2012 | Drape et al. |
| 8,125,736 B2 | 2/2012 | Nojima et al. |
| 8,125,741 B2 | 2/2012 | Shelor |
| 8,144,436 B2 | 3/2012 | Iriuchijima et al. |
| 8,149,542 B2 | 4/2012 | Ando |
| 8,161,626 B2 | 4/2012 | Ikeji |
| 8,169,746 B1 | 5/2012 | Rice et al. |
| 8,194,359 B2 | 6/2012 | Yao et al. |
| 8,248,731 B2 * | 8/2012 | Fuchino ............ 360/245.8 |
| 8,248,734 B2 * | 8/2012 | Fuchino ............ 360/294.4 |
| 8,248,735 B2 | 8/2012 | Fujimoto et al. |
| 8,264,797 B2 | 9/2012 | Emley |
| 8,289,652 B2 | 10/2012 | Zambri et al. |
| 8,295,012 B1 | 10/2012 | Tian et al. |
| 8,310,790 B1 | 11/2012 | Fanslau, Jr. |
| 8,331,061 B2 | 12/2012 | Hanya et al. |
| 8,339,748 B2 | 12/2012 | Shum |
| 8,351,160 B2 * | 1/2013 | Fujimoto ............ 360/245.8 |
| 8,363,361 B2 | 1/2013 | Hanya et al. |

(56) References Cited

U.S. PATENT DOCUMENTS

| | | |
|---|---|---|
| 8,379,349 B1 | 2/2013 | Pro et al. |
| 8,446,694 B1 | 5/2013 | Tian et al. |
| 8,456,780 B1 | 6/2013 | Ruiz |
| 8,498,082 B1 | 7/2013 | Padeski et al. |
| 8,526,142 B1 | 9/2013 | Dejkoonmak et al. |
| 8,559,137 B2 | 10/2013 | Imuta |
| 8,634,166 B2 | 1/2014 | Ohnuki |
| 2001/0012181 A1 | 8/2001 | Inoue et al. |
| 2002/0149888 A1 | 10/2002 | Motonishi et al. |
| 2003/0053258 A1 | 3/2003 | Dunn et al. |
| 2003/0174445 A1 | 9/2003 | Luo |
| 2003/0202293 A1 | 10/2003 | Nakamura et al. |
| 2004/0027727 A1 | 2/2004 | Shimizu et al. |
| 2004/0070884 A1 | 4/2004 | Someya et al. |
| 2004/0125508 A1 | 7/2004 | Yang et al. |
| 2005/0061542 A1 | 3/2005 | Aonuma et al. |
| 2005/0063097 A1 | 3/2005 | Maruyama et al. |
| 2005/0105217 A1 | 5/2005 | Kwon et al. |
| 2005/0254175 A1 | 11/2005 | Swanson et al. |
| 2005/0280944 A1 | 12/2005 | Yang et al. |
| 2006/0044698 A1 | 3/2006 | Hirano et al. |
| 2006/0193086 A1 | 8/2006 | Zhu et al. |
| 2006/0209465 A1 | 9/2006 | Takikawa et al. |
| 2006/0238924 A1 | 10/2006 | Gatzen |
| 2007/0133128 A1 | 6/2007 | Arai |
| 2007/0223146 A1 | 9/2007 | Yao et al. |
| 2007/0253176 A1 | 11/2007 | Ishii et al. |
| 2008/0144225 A1 | 6/2008 | Yao et al. |
| 2008/0192384 A1 | 8/2008 | Danielson et al. |
| 2008/0198511 A1 | 8/2008 | Hirano et al. |
| 2008/0273266 A1 | 11/2008 | Pro |
| 2008/0273269 A1 | 11/2008 | Pro |
| 2009/0080117 A1 | 3/2009 | Shimizu et al. |
| 2009/0244786 A1 | 10/2009 | Hatch |
| 2010/0067151 A1 | 3/2010 | Okaware et al. |
| 2010/0165515 A1* | 7/2010 | Ando .................. 360/290 |
| 2010/0165516 A1* | 7/2010 | Fuchino ............... 360/294.4 |
| 2010/0177445 A1 | 7/2010 | Fuchino |
| 2010/0290158 A1 | 11/2010 | Hanya et al. |
| 2011/0096438 A1 | 4/2011 | Takada et al. |
| 2011/0141624 A1* | 6/2011 | Fuchino et al. ......... 360/244.2 |
| 2011/0228425 A1 | 9/2011 | Liu et al. |
| 2011/0242708 A1 | 10/2011 | Fuchino |
| 2011/0279929 A1* | 11/2011 | Kin ................... 360/294.4 |
| 2012/0002329 A1 | 1/2012 | Shum et al. |
| 2013/0242434 A1 | 9/2013 | Bjorstrom et al. |
| 2013/0242436 A1 | 9/2013 | Yonekura |
| 2013/0265674 A1 | 10/2013 | Fanslau |

FOREIGN PATENT DOCUMENTS

| | | |
|---|---|---|
| JP | 9198825 A | 7/1997 |
| JP | 10003632 A | 1/1998 |
| JP | 2001202731 A | 7/2001 |
| JP | 2002170607 A | 6/2002 |
| JP | 2003223771 A | 8/2003 |
| JP | 2004039056 A | 2/2004 |
| JP | 2005209336 A | 8/2005 |
| WO | WO9820485 A1 | 5/1998 |

OTHER PUBLICATIONS

U.S. Appl. No. 13/690,883 entitled Microstructure Patterned Surfaces For Integrated Lead Head Suspensions, filed Nov. 30, 2012.

U.S. Appl. No. 13/827,622 entitled Mid-Loadbeam Dual Stage Actuated (DSA) Disk Drive Head Suspension, filed Mar. 14, 2013.

U.S. Appl. No. 14/056,481 entitled Two-Motor Co-Located Gimbal-Based Dual Stage Actuation Disk Drive Suspensions With Motor Stiffeners, filed Oct. 17, 2013.

U.S. Appl. No. 13/955,204 entitled Damped Dual Stage Actuation Disk Drive Suspensions, filed Jul. 31, 2013.

U.S. Appl. No. 13/972,137 entitled Co-Located Gimbal-Based Dual Stage Actuation Disk Drive Suspensions With Offset Motors, filed Aug. 21, 2013.

U.S. Appl. No. 14/026,427 entitled Co-Located Gimbal-Based Dual Stage Actuation Disk Drive Suspensions, filed Sep. 13, 2013.

U.S. Appl. No. 14/044,238 entitled Co-Located Gimbal-Based Dual Stage Actuation Disk Drive Suspensions With Motor Stifeners, filed Oct. 2, 2013.

U.S. Appl. No. 14/050,060 entitled Co-Located Gimbal-Based Dual Stage Actuation Disk Drive Suspensions With Dampers, filed Oct. 10, 2013.

U.S. Appl. No. 13/365,443 entitled Elongated Trace Tethers For Disk Drive Head Suspension Flexures, filed Feb. 3, 2012.

U.S. Appl. No. 14/141,617 entitled Disk Drive Suspension Assembly Having A Partially Flangeless Load Point Dimple, filed Dec. 27, 2013, 53 pages.

U.S. Appl. No. 14/145,515 entitled Balanced Co-Located Gimbal-Based Dual Stage Actuation Disk Drive Suspensions, filed Dec. 31, 2013, 39 pages.

* cited by examiner

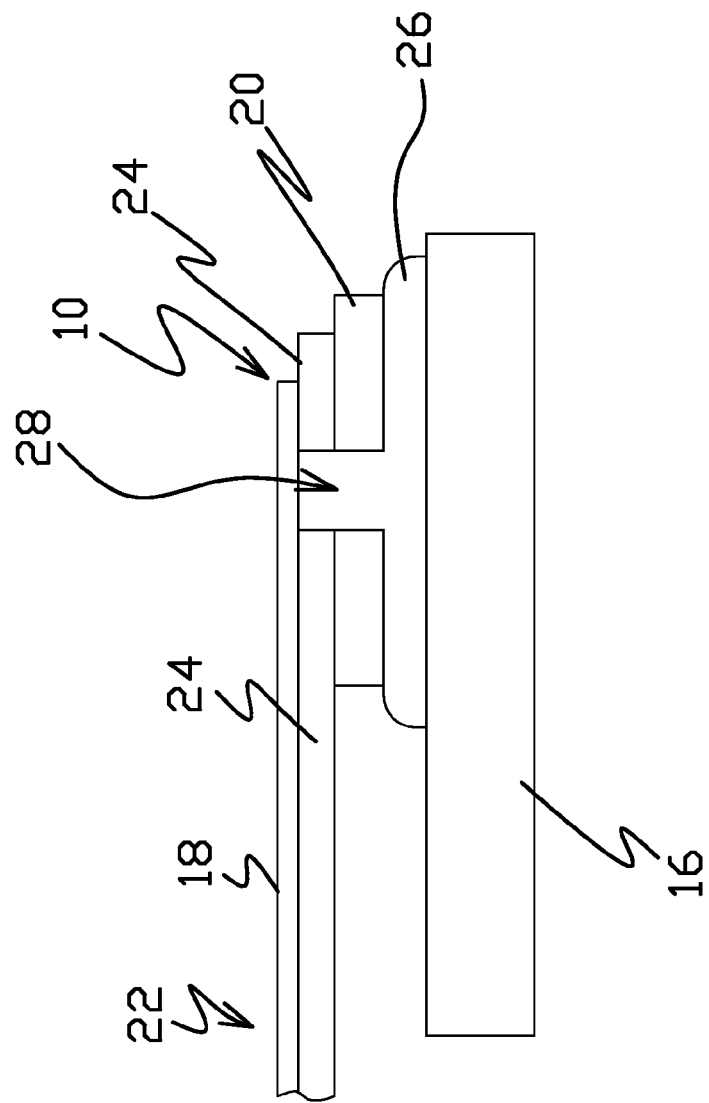

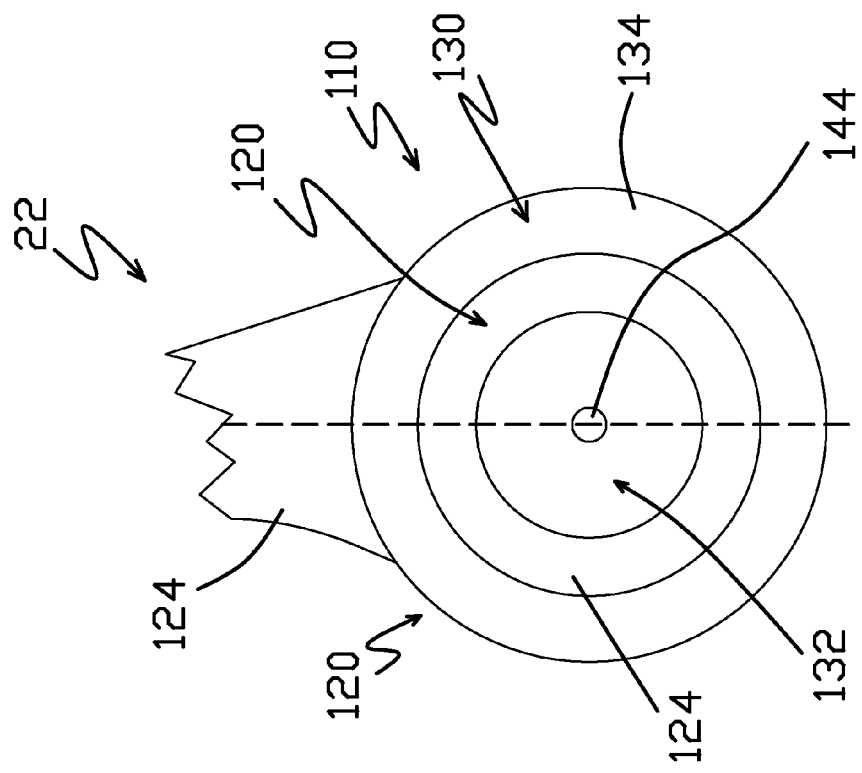
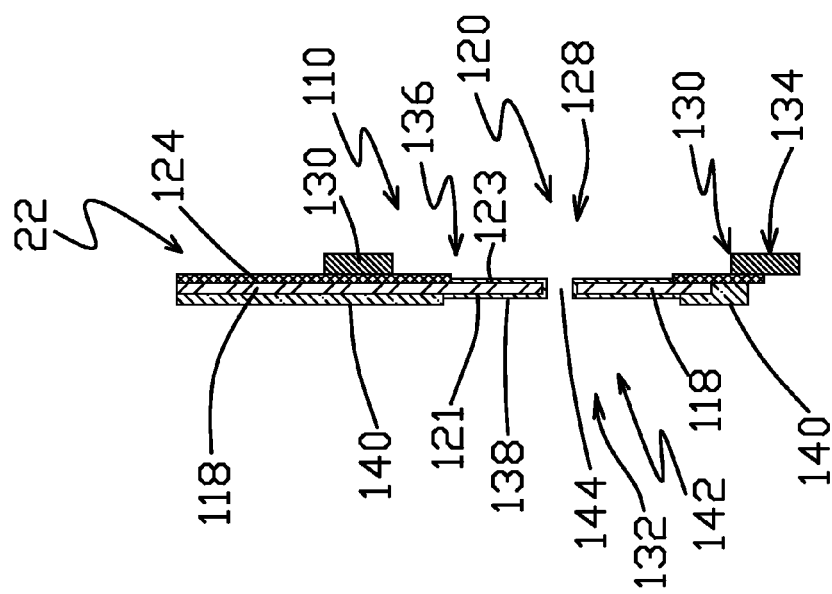

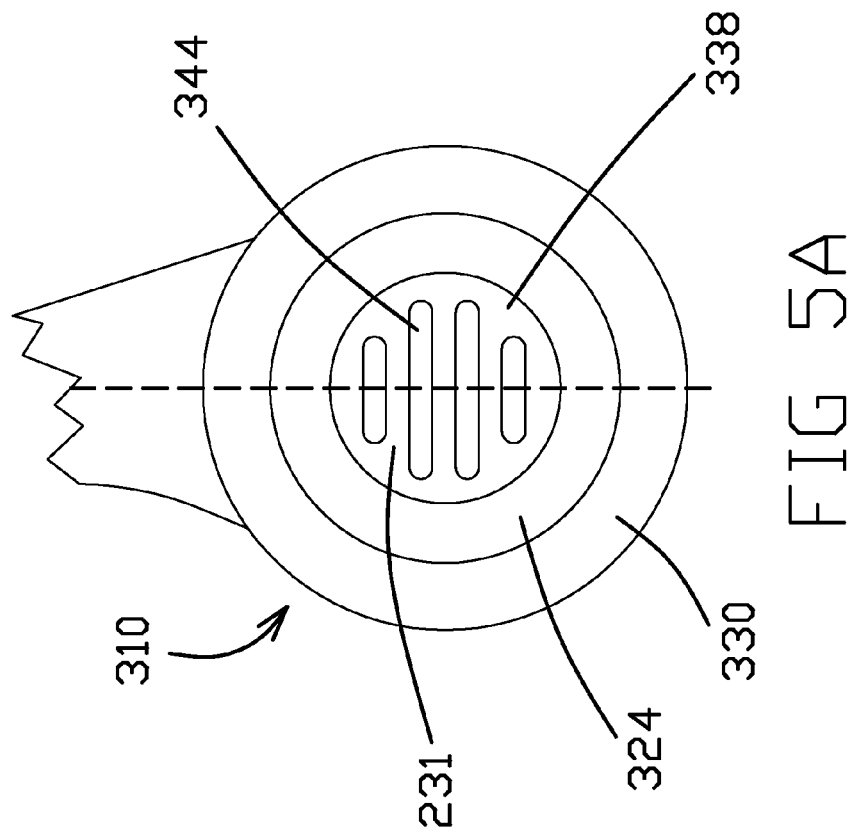
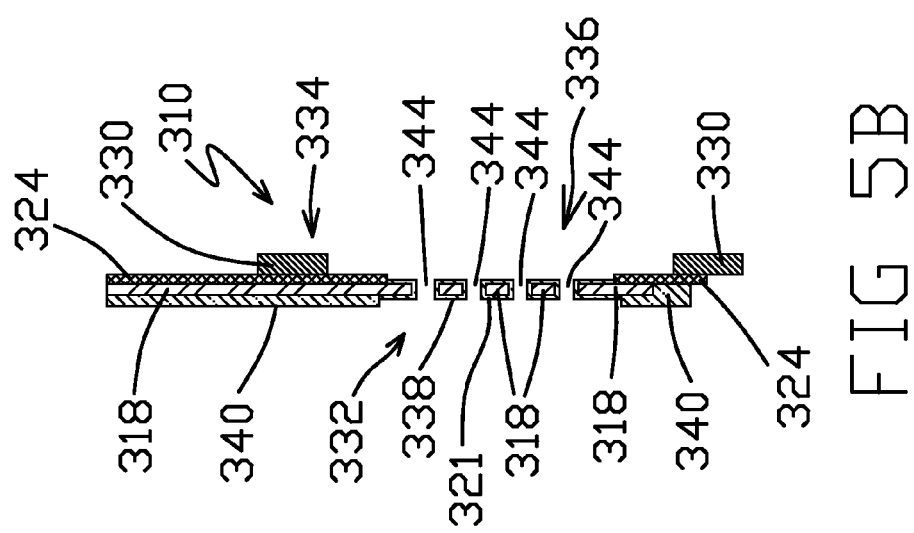

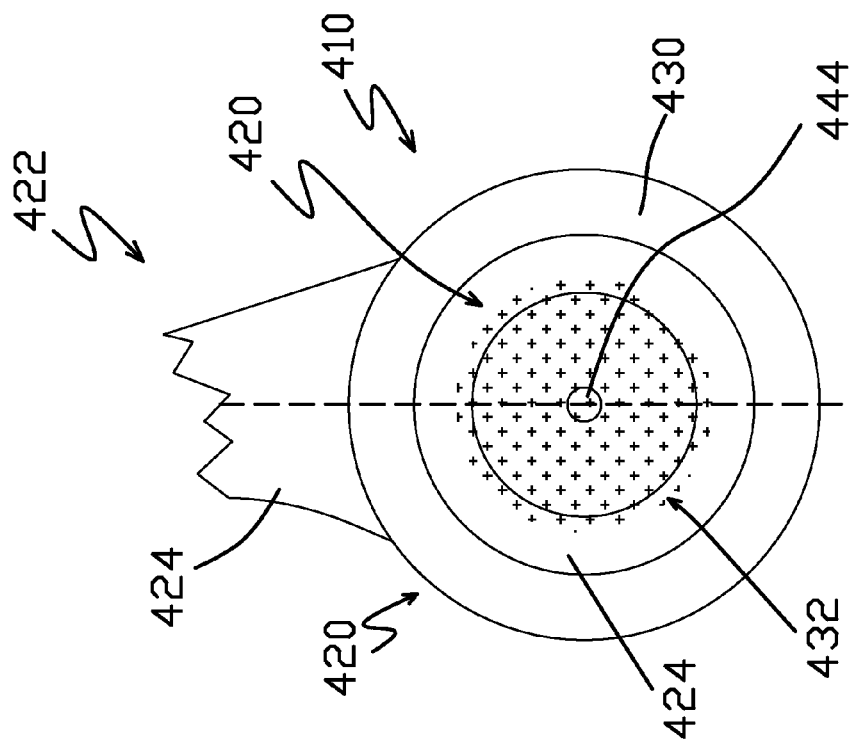
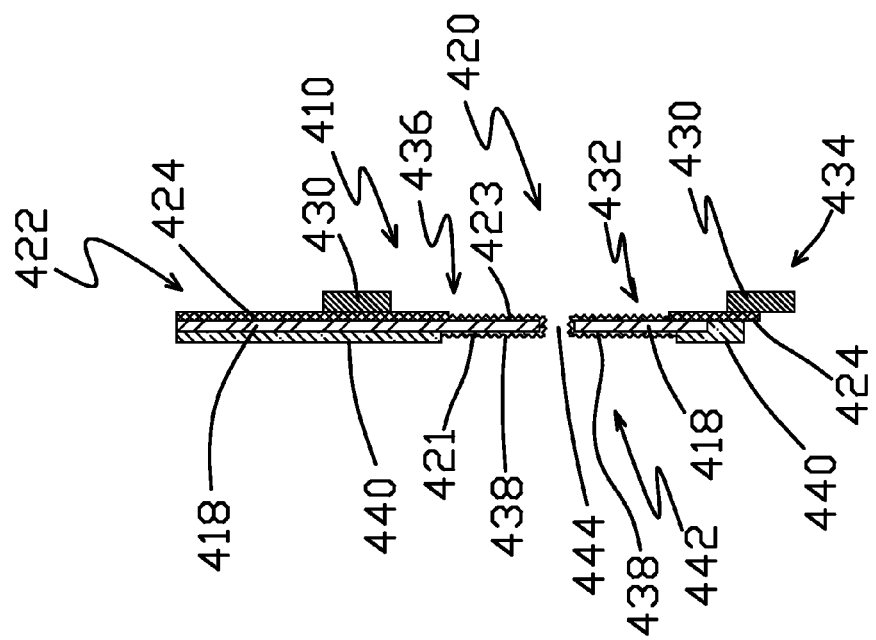

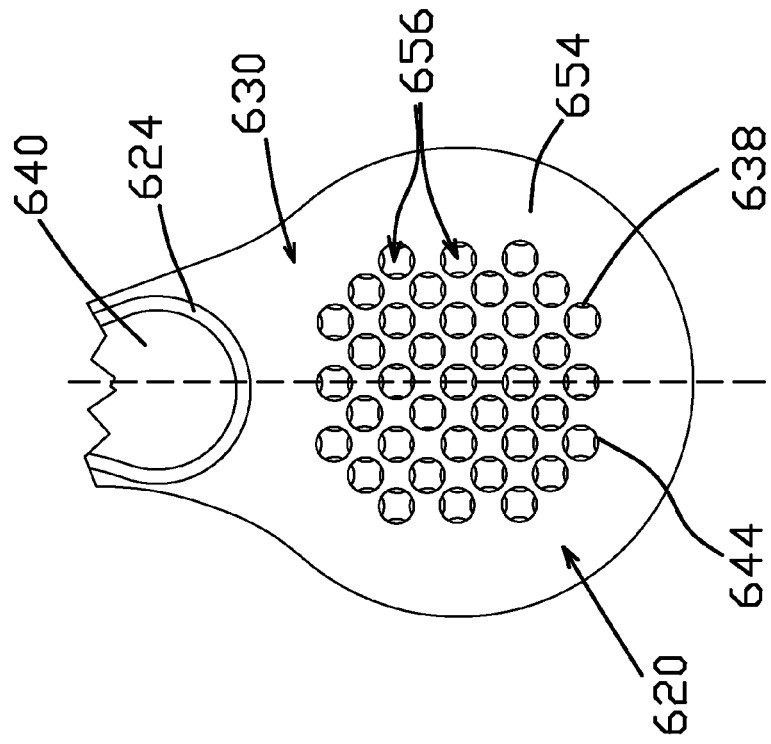
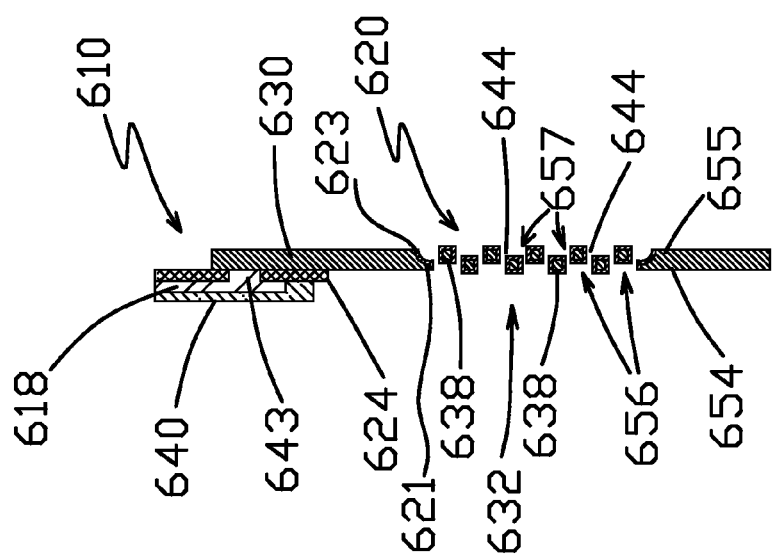
FIG 8A
FIG 8B

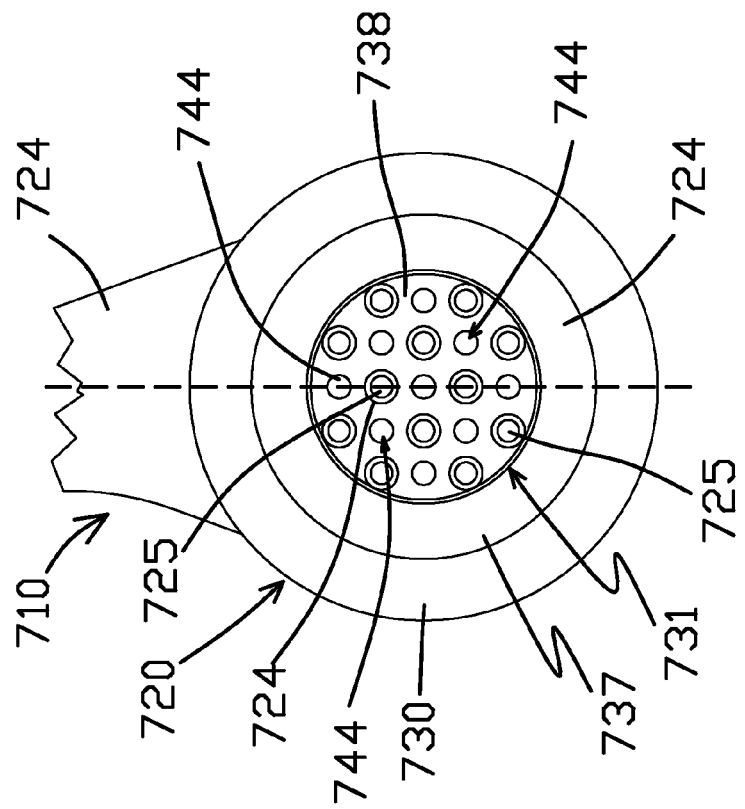
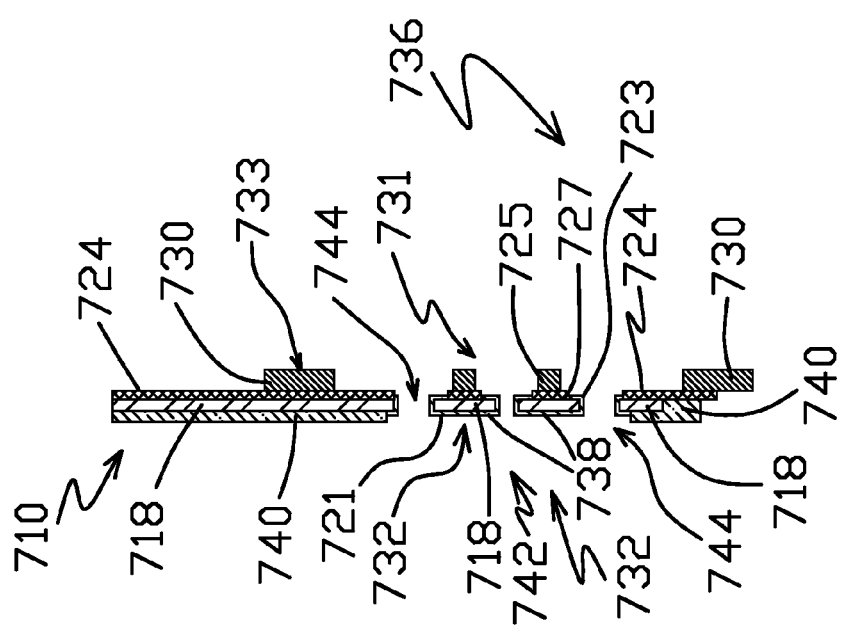

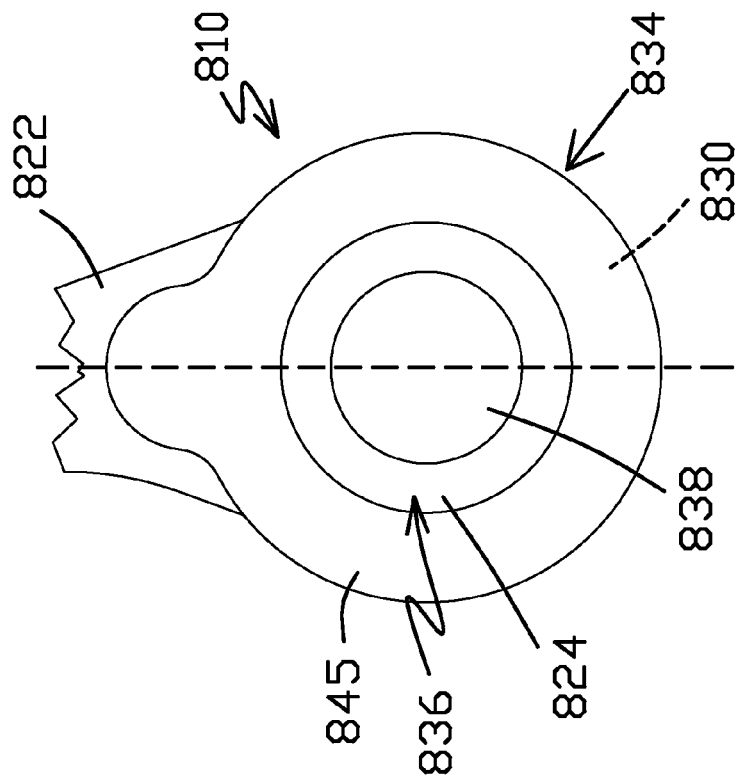
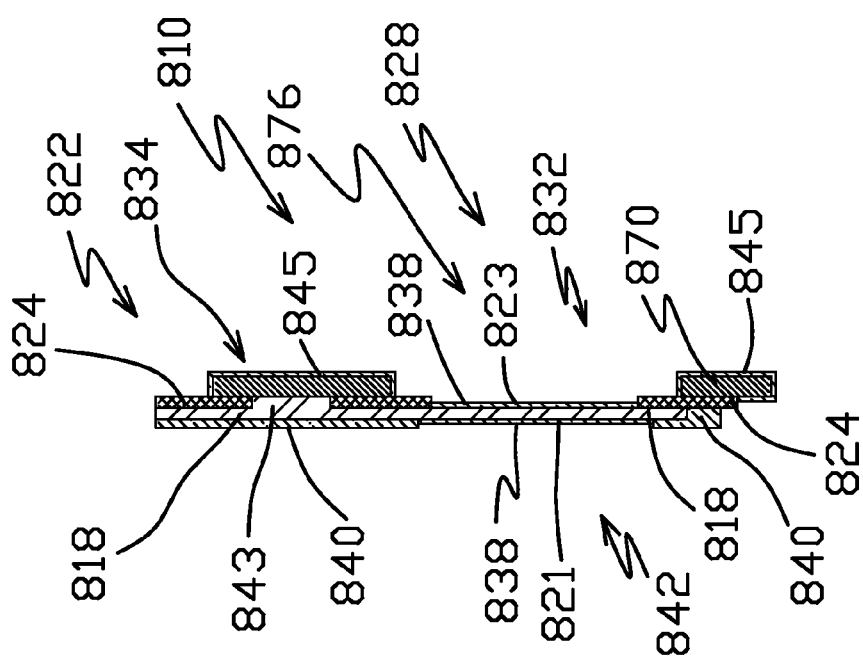

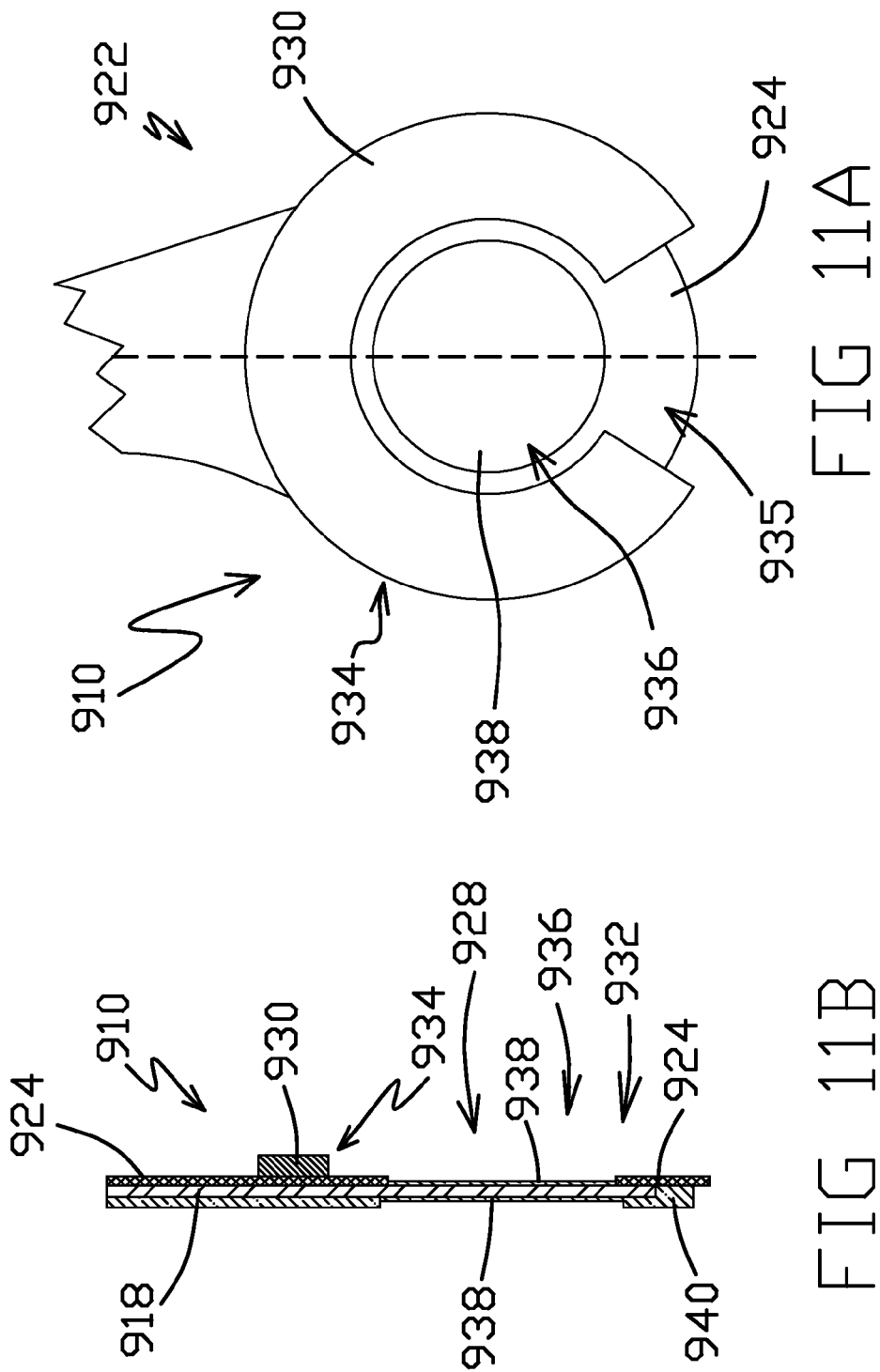

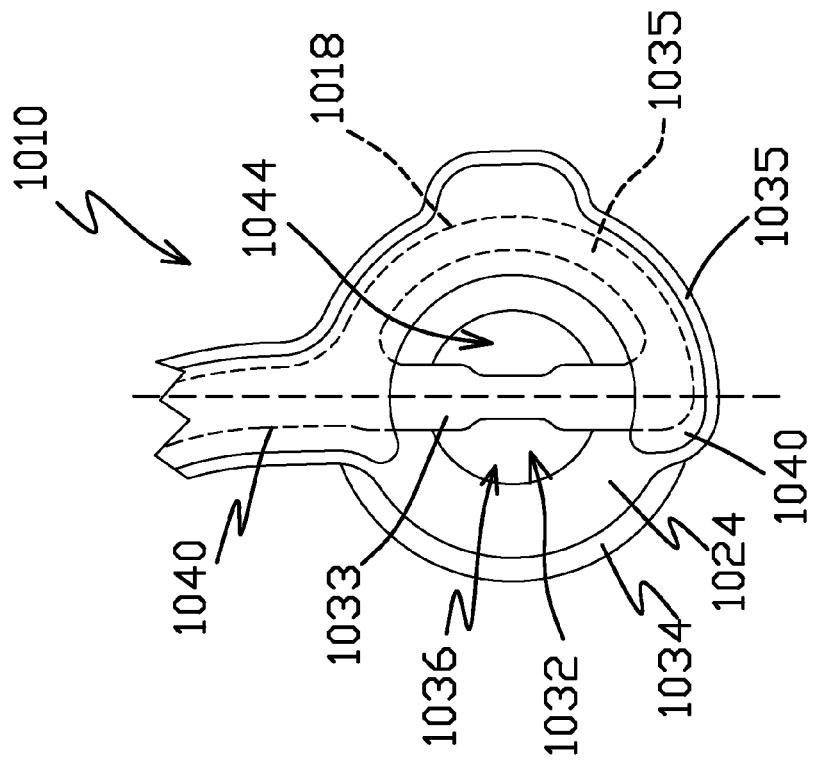
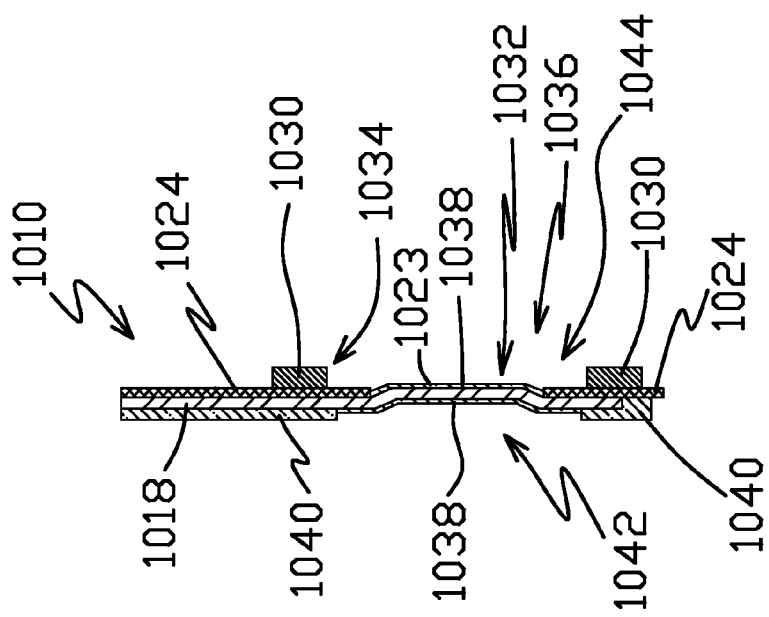

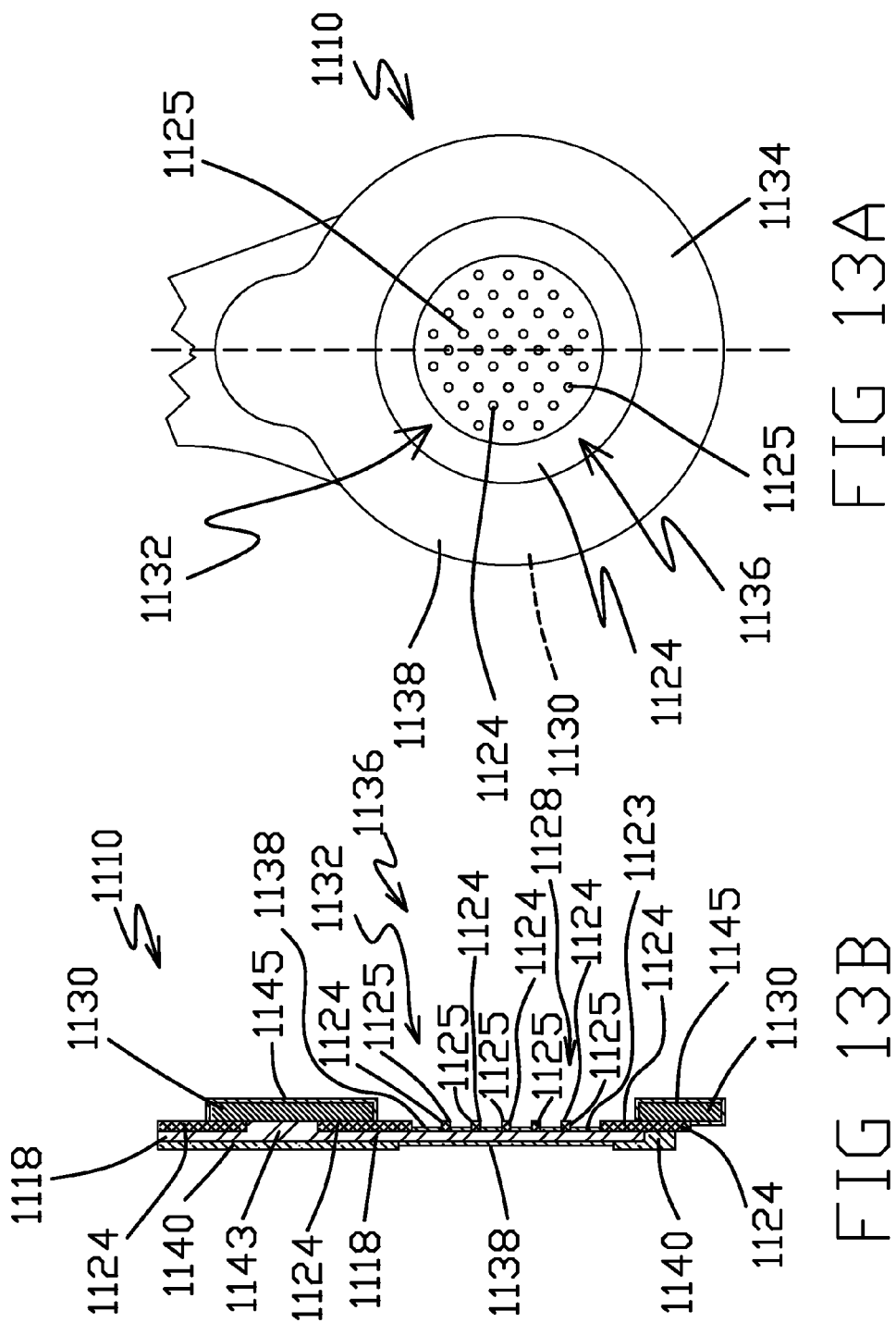

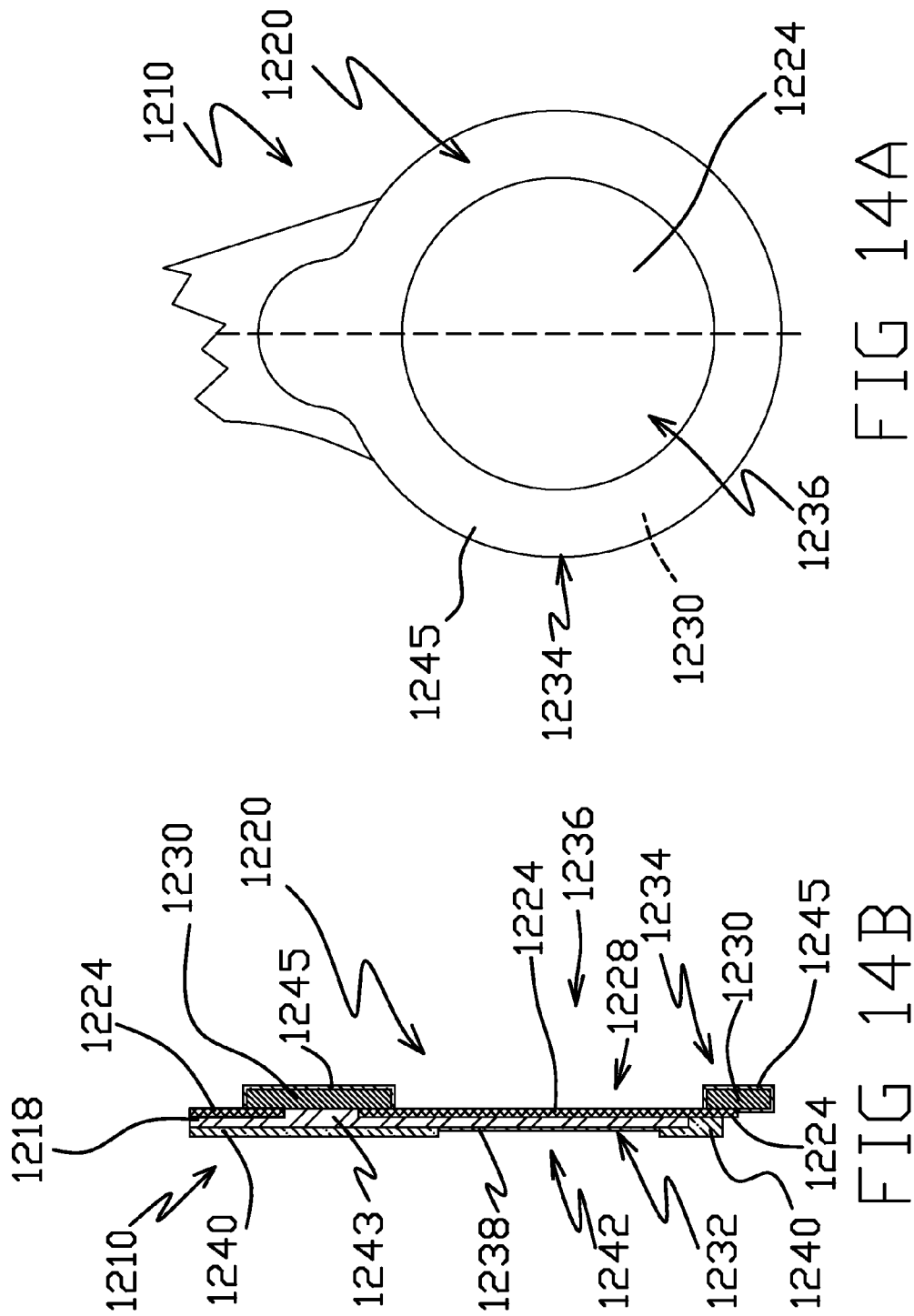

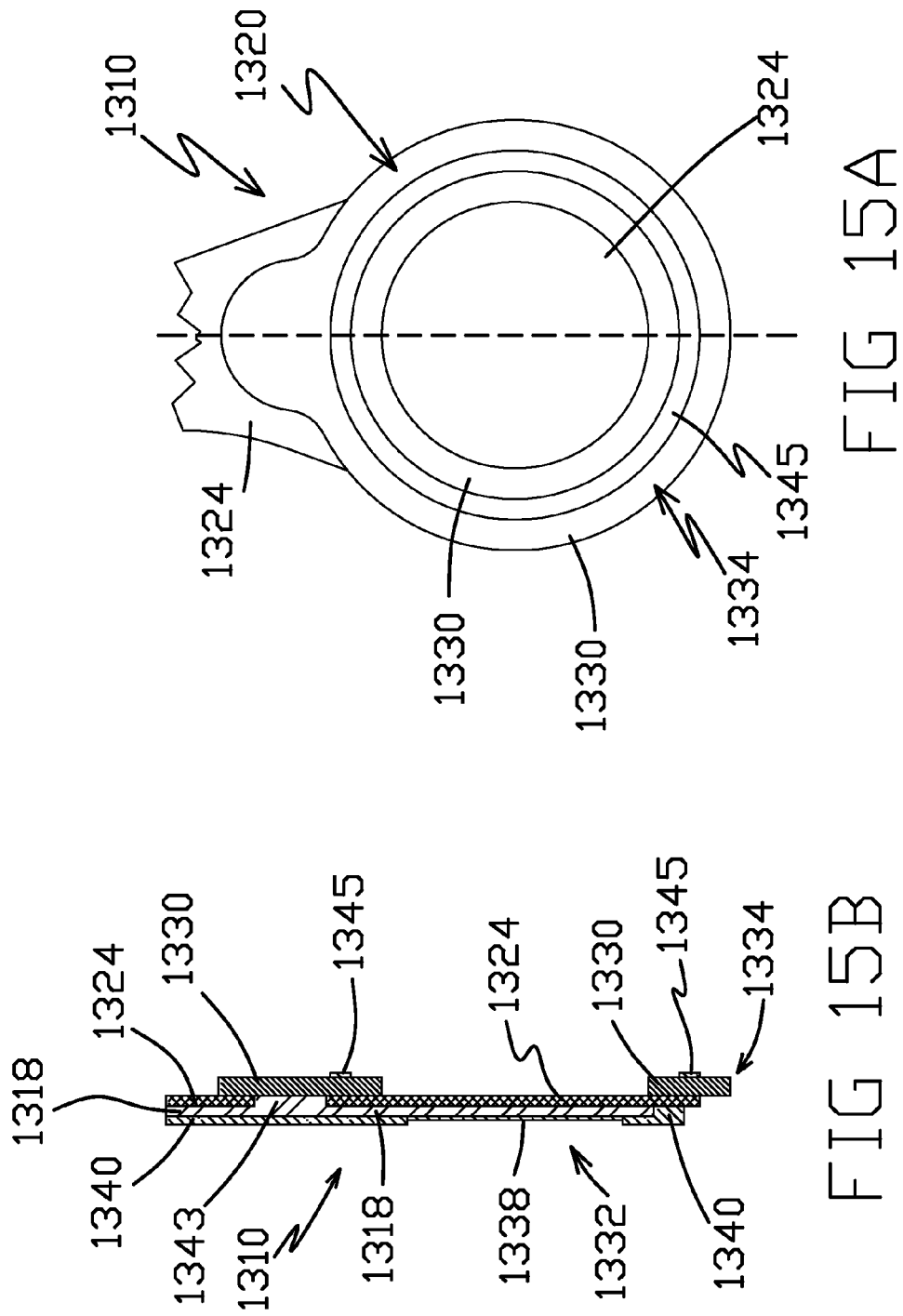

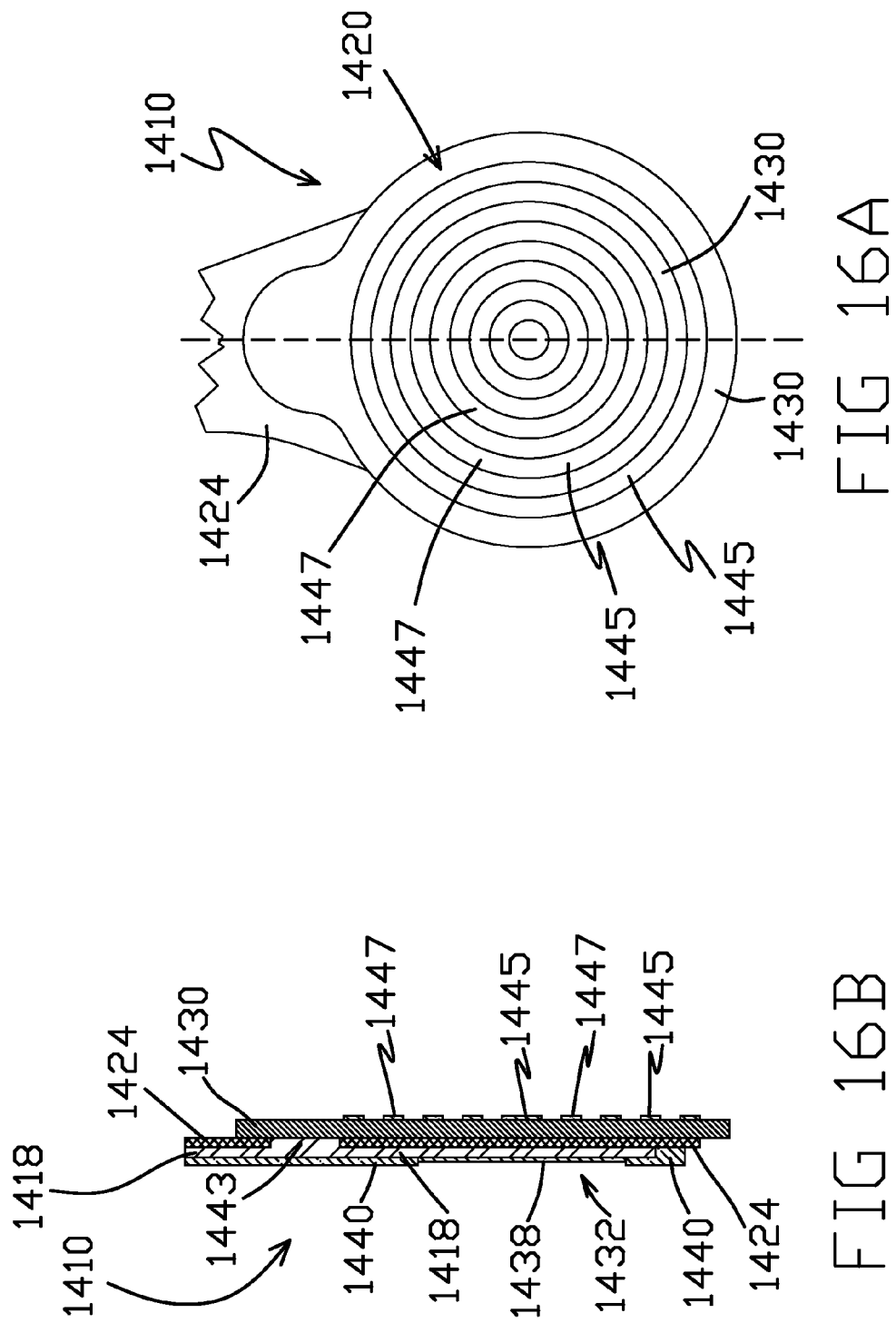

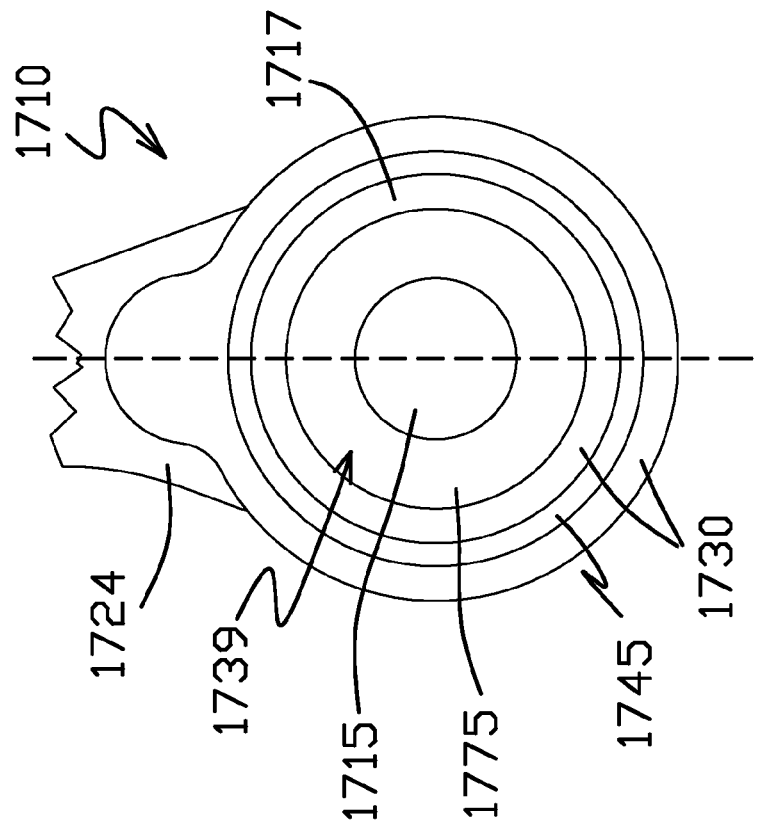
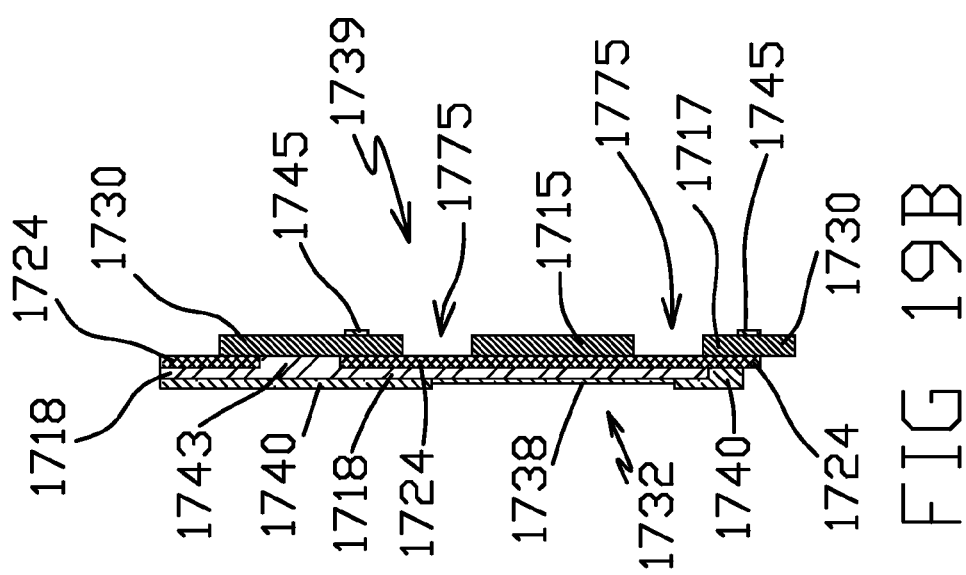

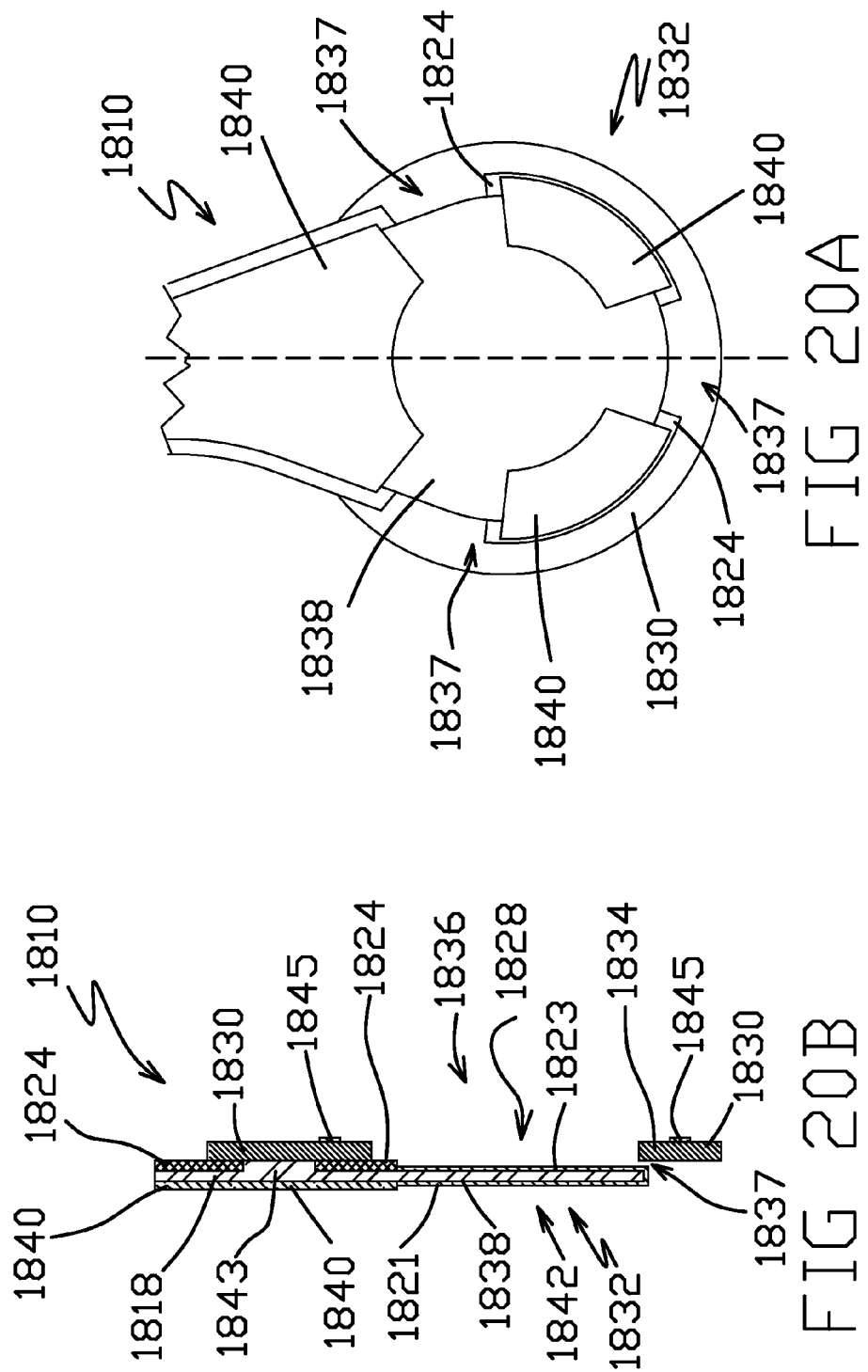

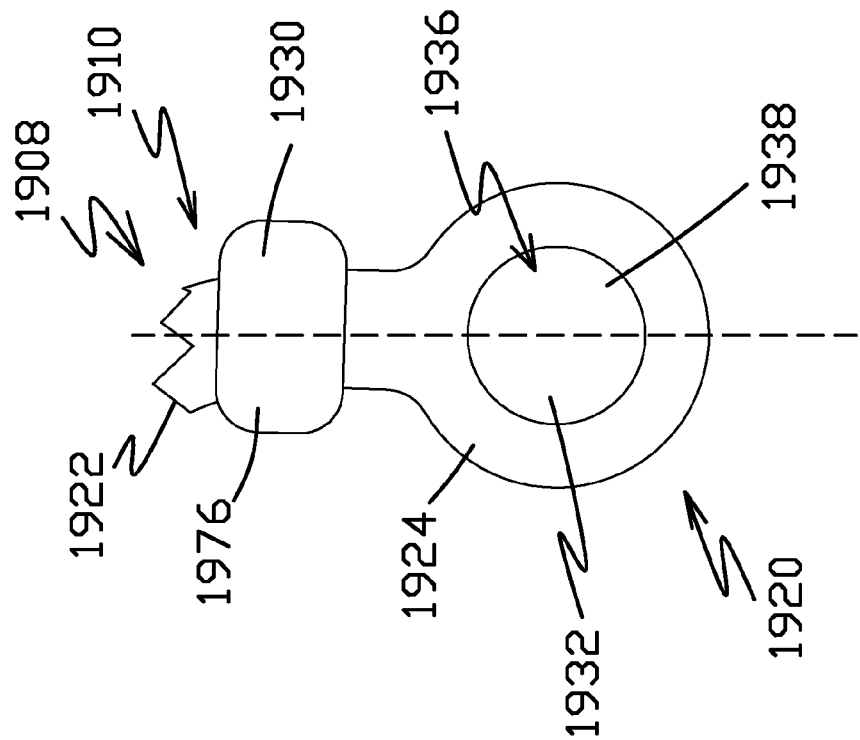
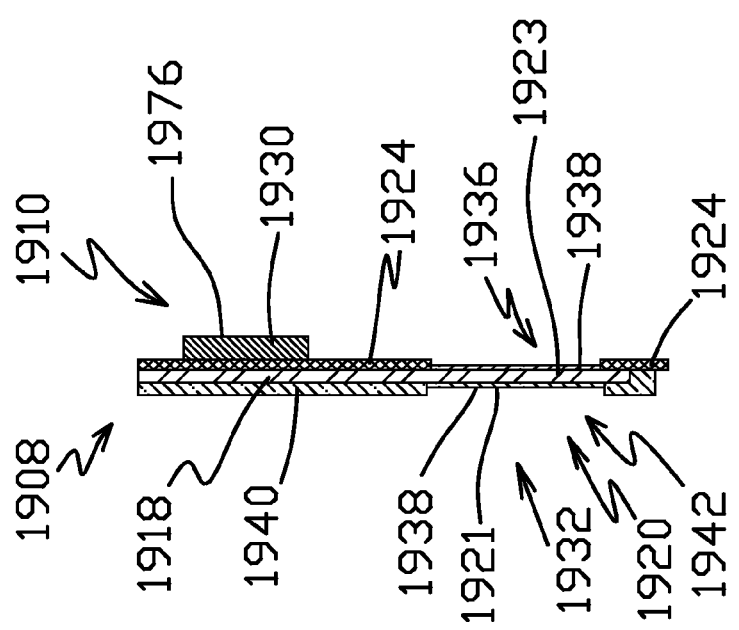

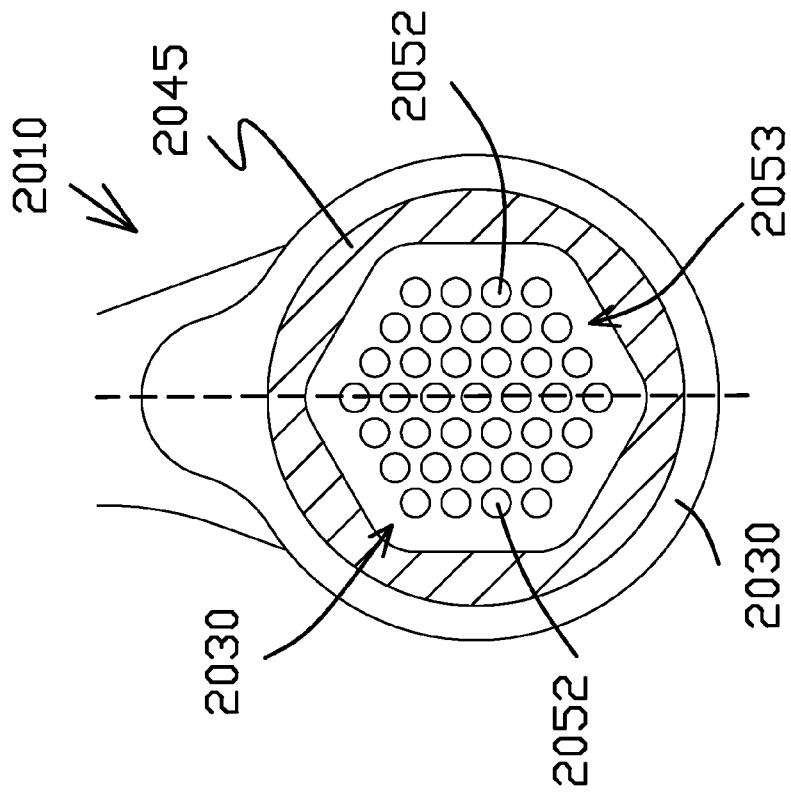
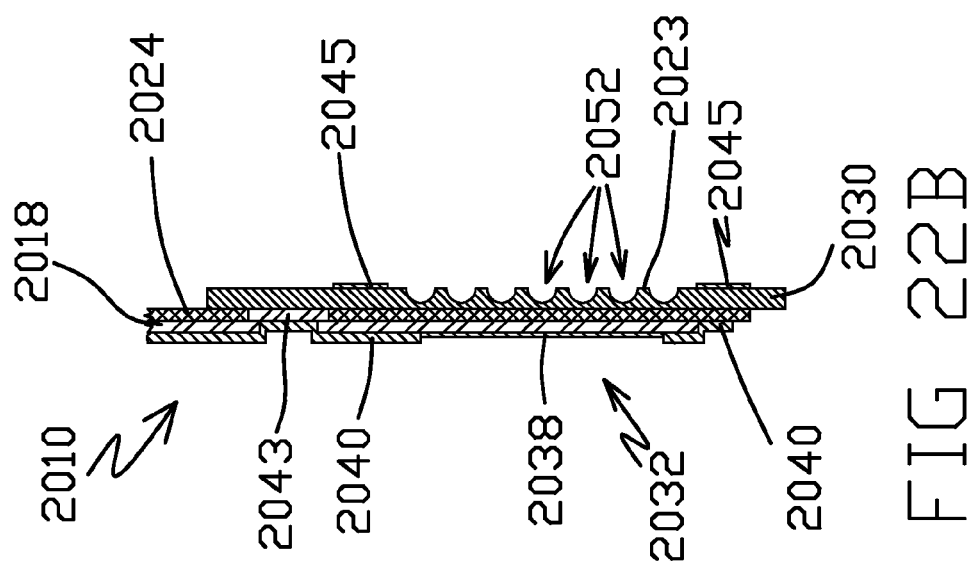

ELECTRICAL CONTACTS TO MOTORS IN DUAL STAGE ACTUATED SUSPENSIONS

CROSS-REFERENCE TO RELATED APPLICATIONS

This application claims the benefit of priority of U.S. Provisional Patent Application No. 61/857,434, filed on Jul. 23, 2013, and which is incorporated herein by reference in its entirety.

TECHNICAL FIELD

The present invention relates generally to terminal pads or electrical contacts of suspensions for disk drives. In particular, the invention relates to electrical contacts to motors in dual stage actuated (DSA) suspensions.

BACKGROUND

DSA disk drive head suspensions and disk drives incorporating DSA suspensions are generally known and commercially available. Suspensions of these types are, for example, shown in the U.S. patent application no. 2010/0177445 to Fuchino, U.S. patent application no. 2011/0228425 to Liu et al., U.S. patent application no. 2012/0002329 to Shum et al., U.S. Pat. No. 8,149,542 to Ando, and U.S. Pat. No. 8,339,748 to Shum et al. each of which is incorporated herein by reference in its entirety for all purposes.

There remains a continuing need for suspensions and components having improved electrical contacts to the PZT or other motors of the DSA suspensions. In particular, there is a need for electrical contacts with enhanced electrical and mechanical characteristics.

SUMMARY

Various embodiments concern a dual stage actuation flexure having a motor contact paddle for connecting to a terminal of a piezoelectric motor. The flexure can comprise a paddle having a top side and a bottom side, the paddle comprising at least one void, each void extending through the paddle from the bottom side to the top side. The paddle can further comprise a stainless steel base, a conductor comprising a layer of metal, and a dielectric layer having a first section and a second section, the first section positioned between the conductor and the stainless steel base to overlap the stainless steel base and the second section extending beyond the stainless steel base to not overlap the stainless steel base. The bottom side of the paddle can be configured to connect to the terminal with electrically conductive adhesive to electrically connect the terminal to the conductor.

Various embodiments concern a DSA flexure having a motor contact paddle for connecting to a terminal of a piezoelectric motor. The flexure can comprise a paddle having a top side and a bottom side opposite the top side. The paddle can comprise a metal base and a contact pad, the contact pad comprising a layer of metal, a first surface on the top side of the paddle, a second surface on the bottom side of the paddle opposite the first surface, and at least one void, each void extending through the contact pad from the first surface to the second surface and exposed on the top side. The paddle can further comprise a dielectric layer positioned between the contact pad and the metal base and a trace layer electrically connected to the contact pad, the trace layer extending along the DSA flexure. The bottom side can be configured to connect to the terminal with electrically conductive adhesive to electrically connect the trace layer to the terminal, and each void is sufficiently small to prevent wicking of conductive adhesive through the void to the first surface.

Various embodiments concern A DSA flexure having a motor contact paddle for connecting to a terminal of a piezoelectric motor. Such a flexure can comprise a paddle having a top side and a bottom side opposite the top side. The paddle can further comprise a metal base comprising a first surface on the top side of the paddle, a second surface on the bottom side of the paddle opposite the second surface, and at least one void, each void extending through the metal base from the first surface to the second surface, the at least one void exposed on the top side. The paddle can further comprise a trace layer that extends along the flexure and is electrically connected to the metal base and a dielectric layer having a first section and a second section, the first section positioned between the trace layer and the metal base. The bottom side can be configured to connect to the terminal with electrically conductive adhesive to electrically connect the trace layer to the terminal.

Various embodiments concern A DSA flexure having a motor contact paddle for connecting to a terminal of a piezoelectric motor. Such a flexure can comprise a paddle having a top side and a bottom side opposite the top side. The paddle can further comprise a metal base comprising a first surface on the top side of the paddle, a second surface on the bottom side of the paddle opposite the second surface, a first plurality of depressions formed in the first surface in a first grid pattern, and a second plurality of depressions formed in the second surface in a second grid pattern that is offset from the first grid pattern. The first plurality of depressions can connect with the second plurality of depressions to form a plurality of voids that extend from the bottom side to the top side. The paddle can further comprise a trace layer that extends along the flexure and is electrically connected to the metal base. The bottom side can be configured to connect to the terminal with electrically conductive adhesive to electrically connect the terminal to the trace layer.

Further features and modifications of the various embodiments are further discussed herein and shown in the drawings.

BRIEF DESCRIPTION OF THE DRAWINGS

FIG. 1C is a cross sectional view along line A-A of the paddle of FIG. 1B.

FIGS. 2A and 2B are bottom and sectional side views, respectively, of a DSA paddle.

FIGS. 5A and 5B are bottom and sectional side views, respectively, of a paddle of a DSA suspension.

FIGS. 6A and 6B are bottom and sectional side views, respectfully, of a paddle of a DSA suspension.

FIGS. 8A and 8B are top and side sectional views, respectively, of a paddle of a DSA suspension.

FIGS. 9A and 9B are bottom and side sectional views, respectively, of a paddle of a DSA suspension.

FIGS. 10A and 10B are bottom and side sectional views, respectively, of a paddle of a DSA suspension.

FIGS. 11A and 11B are bottom and sectional side views, respectively, of a paddle of a DSA suspension.

FIGS. 12A and 12B are top and sectional side views, respectively, of a paddle of a DSA suspension.

FIGS. 13A and 13B are bottom and sectional side views, respectively, of a paddle of a DSA suspension.

FIGS. 14A and 14B are bottom and sectional side views, respectively, of a paddle of a DSA suspension.

FIGS. 15A and 15B are bottom and side sectional views, respectively, of a paddle of a DSA suspension.

FIGS. 16A and 16B are bottom and side sectional views, respectively, of a paddle of a DSA suspension.

FIGS. 19A and 19B are bottom and side sectional views, respectively, of a paddle of a DSA suspension.

FIGS. 20A and 20B are top and side sectional views, respectively, of a paddle of a DSA suspension.

FIGS. 21A and 21B are bottom and side sectional views, respectively, of a paddle of a DSA suspension.

FIGS. 22A and 22B are bottom and side sectional views, respectively, of a paddle of a DSA suspension.

While multiple embodiments are disclosed, still other embodiments of the present disclosure will become apparent to those skilled in the art from the following detailed description, which shows and describes illustrative embodiments of this disclosure. Accordingly, the drawings and detailed description are to be regarded as illustrative in nature and not restrictive.

DESCRIPTION OF THE INVENTION

Figure 1A:
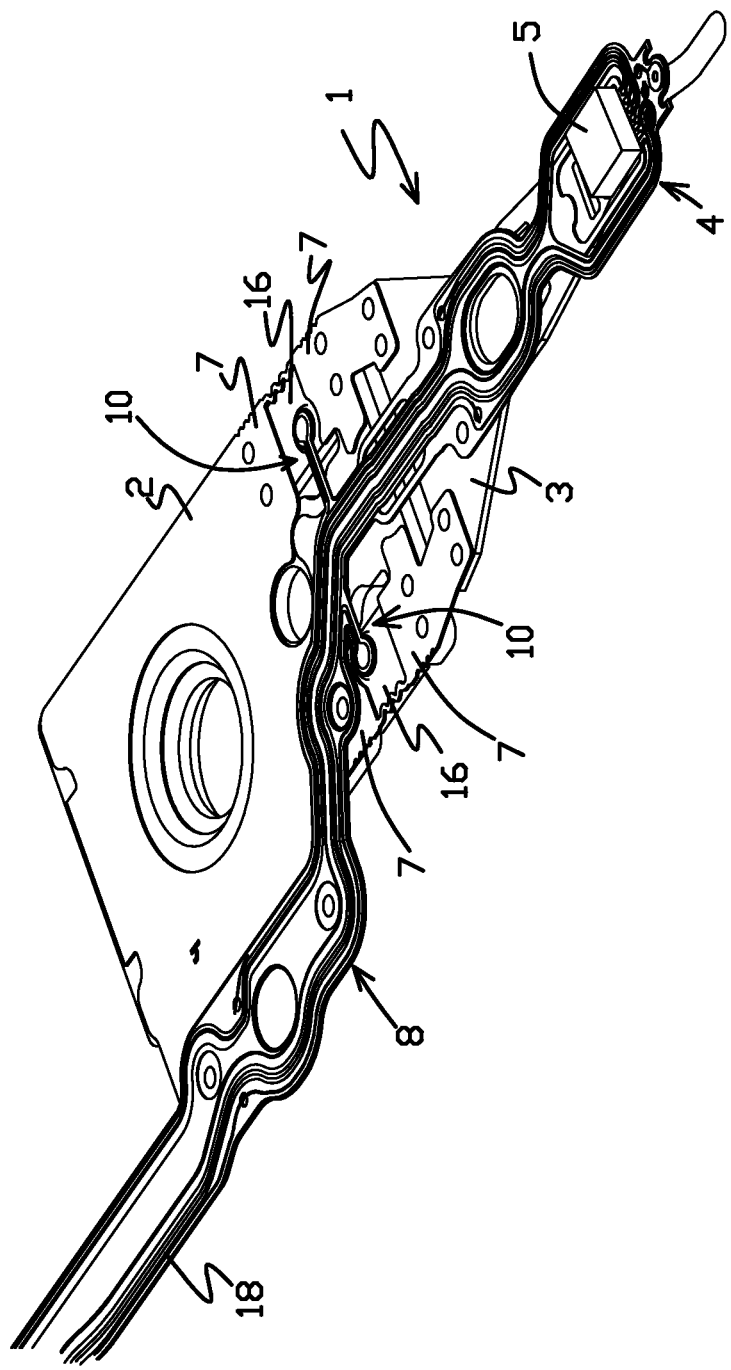
FIG. 1A is a perspective view of a DSA suspension.

FIG. 1A shows a perspective view of a DSA suspension 1. The illustrated DSA suspension 1 includes a baseplate 2, a load beam 3, a gimbal 4 with a head slider 5 mounted thereon, and an integrated flexure 8 having traces 18. The flexure 8 is mounted to the load beam 3. Welding is typically used to join these components. The baseplate 2 and the load beam 3 are typically formed from metal such as stainless steel. The flexure 8 likewise can include a stainless steel base layer that provides much of the mechanical support the flexure 8 structure. The whole DSA suspension 1 can be moved to scan the head slider 5 over a spinning disk by a head suspension actuation system (not illustrated) that connects to the baseplate 2 as is known in the art. The head slider 5 comprises transducer elements for reading from, and wiring to, the spinning disk.

While movement of the whole DSA suspension 1 by the head suspension actuation system provides relatively course position control of a head slider 5, a second stage actuation functionality of the illustrated DSA suspension 1 is incorporated into the baseplate 2 to control finer sway adjustments. Microactuations along the DSA suspension 1 produced by the motors 16 can provide relatively fine positioning adjustment of the head slider 5. The baseplate 2 includes mountings for motors 16. The motors 16 are typically piezoelectric elements that can be electrically activated to move the load beam 3 laterally relative to the baseplate 2. In various other embodiments, the motors 16 can be located at other locations (e.g., on the load beam 3 or the gimbal 4) to move a distal portion of the suspension 1 relative to a proximal portion of the suspension 1. Motors 16 are shown mounted to the baseplate 2 in the motor-receiving openings of the baseplate 2 via tabs 7. The tabs 7 can be stainless steel layers welded to the baseplate 2 and/or the load beam 3. Epoxy or other adhesive can be used to mount the motors 16 to the tabs 7 or other component. Each motor 16 comprises a generally planar element with a length (e.g., along a longitudinal axis) and a width. The motors 16 can be any suitable type of microactuator. For example, the motors 16 can each be a piezoelectric (PZT) microactuator, which may include a piezoelectric layer of lead zirconium titanate, polymers such as polyvinylidene fluoride (PVDF), or other piezoelectric or electrostrictive types of materials.

The motors 16 must be electrically connected to a circuit to power the motors 16. As will be appreciated, each motor 16 includes terminals (not shown) for electrically coupling the motor 16 to such power supply circuit. The circuit can be part of flexure 8, such as a trace 18 of the flexure 8. The trace 18 can electrically connect to a first terminal of the motor 16. The second terminal of the motor 16 can connect to a second trace 18 of the flexure 8, the stainless steel of the flexure 8, the baseplate 2, or the load beam 3, for example. A paddle 10 branching from the flexure 8 can be used to mechanically connect to the motor terminals to establish a robust electrical connection to the motors 16, as further discussed herein.

Figure 1B:
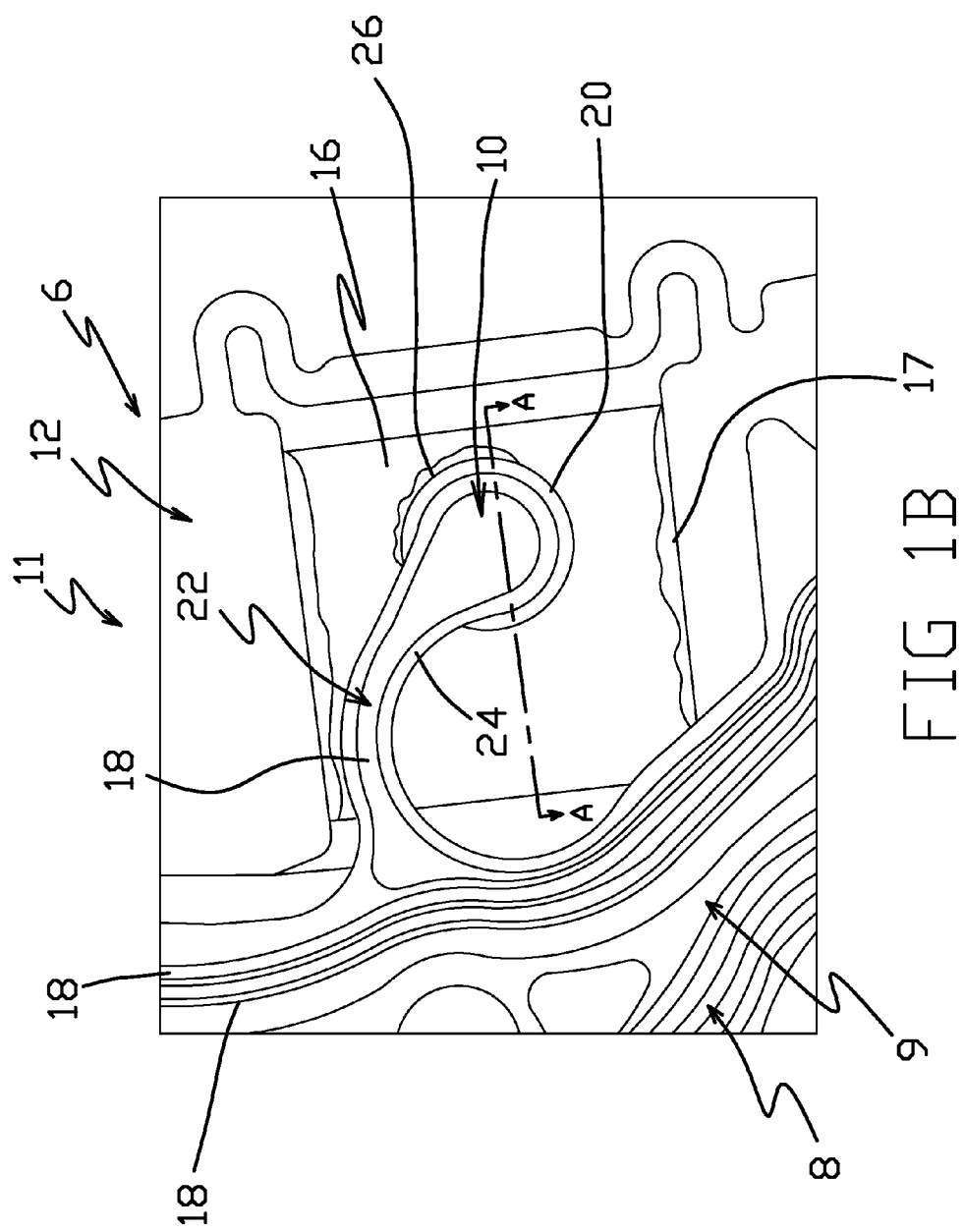
FIG. 1B is a detailed plan view of the paddle of the suspension of FIG. 1A.

FIG. 1B is an illustration of a portion of the DSA suspension 6, specifically showing a body portion 9 of the flexure 8 with a paddle 10. FIG. 1C is a cross sectional view of the motor 16 and paddle 10 along line A-A of FIG. 1B. As shown, the flexure 8 includes a plurality of electrical traces 18. Each trace 18 can be a thin layer of conductive material, such material comprising copper or copper alloy plated with nickel and/or gold, for example. At least one of the traces 18 extends along the paddle 10. Although only a portion of the suspension flexure 8 and load beam 11 are shown in FIG. 1B, the suspension 6, including the flexure 8 and/or the load beam 11, can be any of a wide range of configurations, and that the suspension 6 can include more than one motor 16 and paddle 10. For example, a separate paddle 10 can be provided for each motor 16 on the suspension 1 such that there are two paddles 10 connecting to respective motors 16. In some cases, two separate paddles 10 can respectively connect to two separate terminals on opposite sides (e.g., top and bottom) of a motor 16. The flexure 8, including paddle 10, can be formed using conventional or otherwise known additive and/or subtractive manufacturing processes such as photolithography, wet and dry etching, electroplating, sputtering and other material deposition processes.

In the illustrated embodiment, the paddle 10 includes a conductive metal contact 20. In some embodiments, as described below, the conductive metal contact 20 can take any of a number of different structural configurations and can be formed from conductive metals such as stainless steel, copper or copper alloy, gold and/or nickel, or other conductive materials. For example, the conductive metal contact 20 can take the form of a stainless steel base in the shape of a ring and defining a cavity, as further described herein. The connection portion 22 of the flexure 8 extends from the body portion 9 to the paddle 10. A dielectric insulating layer 24 extends along the flexure 8, including along the paddle 10. In the embodiment shown, the traces 18 extends over the insulating layer 24, including along the paddle 10. A dielectric cover coat layer can be disposed on the traces 18. Dielectric insulating layer 24 electrically isolates the trace 18 from the conductive metal contact 20 and other conductive components. A cavity 28, shown in FIG. 1C, extends through the insulating layer 24 and the conductive metal contact 20 at the paddle 10. The cavity 28 is framed or formed, at least in part, by the ring shape of the conductive metal contact 20 creating a center space within the conductive metal contact 20. As shown, the cavity 28 is filled with conductive adhesive 26.

A portion of the trace 18 is above and adjacent the cavity 28 and functions as a conductive metal contact pad that faces downward into the cavity 28. Conductive adhesive 26 within the cavity 28 can be used to mechanically bond the portion of the trace 18 over the cavity 28 and the conductive metal contact 20 to the motor 16. The conductive adhesive 26 can further electrically connect a terminal on the motor 16 (e.g., on the top side of the motor) to the trace 18 and the conductive metal contact 20. In various other embodiments, the trace 18 and conductive metal contact 20 can be electrically connected by other structures. In use, the conductive adhesive 26 can be dispensed in a viscous uncured form on the bottom side of the paddle 10. For example, the conductive adhesive 26 can be dispensed in the cavity 28 from a bottom access opening. The motor 16 is then placed on the bottom side of the paddle 10 and/or the bottom side of the paddle 10 is placed on the motor 16. The cavity 28 and the conductive adhesive 26 can be centered over a terminal of the motor 16. The paddle 10 and motor 16 can then be pressed together, forcing the conductive adhesive 26 to fill the cavity 28. The conductive adhesive 26 can then cure to form a robust mechanical and electrical connection between the paddle 10 and the motor 16. Various paddle features that facilitate efficient and reliable connection processes are further discussed herein.

FIGS. 2A and 2B are bottom and sectional side views, respectively, of a paddle 110. The paddle 110 can be configured similarly to any other paddle disclosed herein except where noted. Features of the paddle 110 that are the same or similar to those of other embodiments are indicated by similar reference numbers. A bottom or bottom side of a paddle herein refers to the motor-facing contact side of the paddle while a top or top side refers to the side that is opposite the bottom side and faces away from the motor. As shown, the paddle 110 includes a conductive metal contact 120 that includes a stainless steel base 130 and conductive metal contact pad 132. The stainless steel base 130 includes a ring-shaped member 134 that is electrically isolated from the contact pad 132 and the rest of the trace 118 by the dielectric insulating layer 124. Specifically, the trace 118 can contact a first side (e.g., a top side) of the dielectric insulating layer 124 while the stainless steel base 130 contacts a second side (e.g., a bottom side) opposite the first side of the dielectric insulating layer 124. In other embodiments, a conductive via through the dielectric insulating layer 124 can electrically interconnect the stainless steel base 130 to the trace 118. It is noted that, in this embodiment, the ring-shaped member 134 is a closed ring-shaped member 134 such that a 360 degree ring is formed without a gap on the lateral sides of the ring-shaped member 134. Various other embodiments may include a gap in a lateral side of a ring-shaped member, as further discussed herein. As show, dielectric insulating layer 124 can include a first section that overlaps the stainless steel base 130 and a second section that extends beyond the stainless steel base 130 to not overlap the stainless steel base 130 (e.g. the second section can extend along the connection portion 22 of the paddle 110 connecting the paddle 110 to the rest of the flexure 8).

The stainless steel base 130 can be formed from the same layer of stainless steel as other portions of the flexure 108 such as those on the body portion 9 and the connection portion 22 of FIG. 1B. The stainless steel base 130 defines a bottom side access opening 136 inside the ring-shaped member 134. The bottom side access opening 136 provides access to a cavity 128 on the bottom side of the paddle 110, the cavity 128 defined by the contact pad 132 and the ring-shaped member 134, the cavity 128 being open on the bottom side of the paddle 110 by the bottom side access opening 136 and having a single opening, comprising the void 144, on the top side of the paddle 110.

The contact pad 132 is a conductive element configured to electrically connect to a terminal of a motor by a conductive medium such as conductive adhesive. The contact pad 132 may also be mechanically connected to the motor by conductive adhesive attaching to the contact pad 132. In the illustrated embodiment, the contact pad 132 comprises a portion of the trace 118 and a plated outer layer 138 disposed on the portion of the trace 118. The plated outer layer 138 can be, for example, nickel and/or gold deposited directly on the trace 118 material. A dielectric cover coat layer 140 overlays portions of the trace 118 that are non-plated and other portions of the contact pad 132 that are plated. A top side access opening 142 on the top side of the contact pad 132 (e.g., the central portion in the illustrated embodiment) is shown as free from the dielectric cover coat layer 140 to enable electrical contact to the top side of the contact pad 132 (i.e. from the top side of the paddle 110). The contact pad 132 can comprise a top surface 121 on the top side of the contact pad 132 (and on the top side of the paddle 110) and a bottom surface 123 on the bottom side of the contact pad 132 opposite the top surface 121 (and on the bottom side of the paddle 110). The bottom surface 123 of the contact pad 132 is exposed within the bottom side access opening 136 while the top surface 121 of the contact pad 132 is exposed on the top side of the paddle 110. A single void 144 forms a hole through the contact pad 132 between the bottom side access opening 136 and the top side access opening 142 in the embodiment of FIGS. 2A and 2B. More specifically, the void 144 extends through the contact pad 132 from the bottom surface 123 to the top surface 121. As shown in FIG. 2A, the void 144 has a circular profile, however other shapes are possible (e.g., oval, square, rectangle). While one void 144 is shown in the contact pad 132, two or more voids could be provided, each having the configuration described above.

Figure 3:
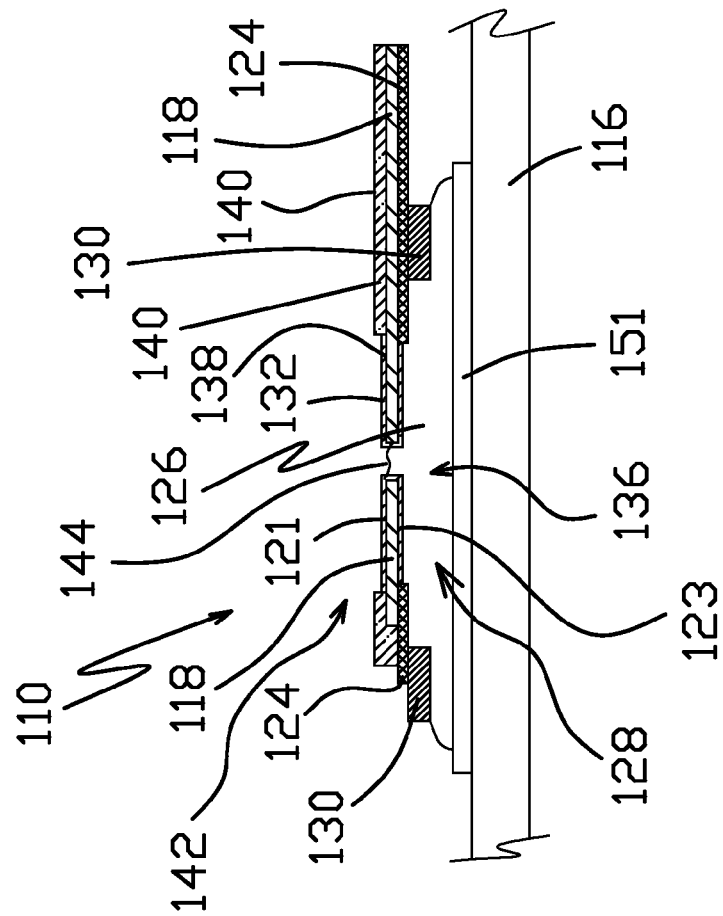
FIG. 3 is an illustration of a paddle of a DSA suspension mounted to a motor.

FIG. 3 is an illustration of the paddle 110 mounted to the terminal pad 151 of a motor 116 by conductive adhesive 126. As shown, the conductive adhesive 126 fills the cavity 128, such as the bottom side access opening 136 and portions of the void 144, but does not extend beyond the top surface of the contact pad 132. The void 144 is sufficiently small to prevent wicking or other passage of the conductive adhesive 126 from the bottom side access opening 136 entirely through the void 144 to the top side access opening 142 of the contact pad 132 when the paddle 110 is connected to a motor 116 by conductive adhesive 126. More specifically, the void 144 is sufficiently small to prevent passage of the conductive adhesive 126 from the bottom surface 123 to the top surface 121 of the contact pad 132 through the void 144. In some embodiments, the conductive adhesive 126 will extend into the void 144 from within the bottom side access opening 136, but only to a height that does not exceed the top surface 121 of the contact pad 132. In general, larger voids will result in adhesive flow onto the top surface 121 of the contact pad 132 to form a rivet structure, while smaller voids will form a semi-rivet structure or no rivet by preventing adhesive flow fully through the void 144 and onto the top surface 121 of the contact pad 132. During manufacturing, it is useful to avoid passage of the conductive adhesive 126 fully through the void 144 to the top surface 121 of the contact pad 132 because the uncured flowable conductive adhesive 126 can come into contact with precision machine tooling to cause unintended tacky adherence between the tooling parts and the paddle 110, interrupting assembly. However, it can be useful to provide a hole of some kind having access to the cavity 128 to allow air to escape the cavity 128 of the paddle 110 when the conductive adhesive 126 enters the cavity 128 from the bottom side access opening 136. Removal of excess air can maximize surface area contact between the conductive adhesive 126 and the elements defining the cavity 128 of the paddle 110 to strengthen the mechanical bond between the paddle 110 and the motor 116 as well as ensure a reliable electrical connection. The void 144 allows air to escape the cavity 128 but does not permit passage of the conductive adhesive 126. Moreover, the void 144 can provide a feature into which the flowing conductive adhesive 126 can integrate to further strengthen the mechanical bond while also providing additional surface area (e.g., the edges of the contact pad 132 defining the void 144) to which to bond.

The size of the void 144 that will provide these characteristics will vary based on factors such as the viscosity of the conductive adhesive 126 and cure time. The conductive adhesive 126 can be a hybrid epoxy-acrylate isotropically conductive adhesive. A conductive adhesive having a nominal viscosity 10,600 cP is an example of a suitable conductive adhesive 126. In testing, a hole, similar to void 144 and having a diameter of about 20-30 µm, retained the adhesive within the hole while a 50 µm hole mostly retained the adhesive but allowed some adhesive to escape from the hole. Larger holes (e.g., 80-115 µm) allowed significant amounts of the adhesive to squeeze out through the holes.

Figure 4A:
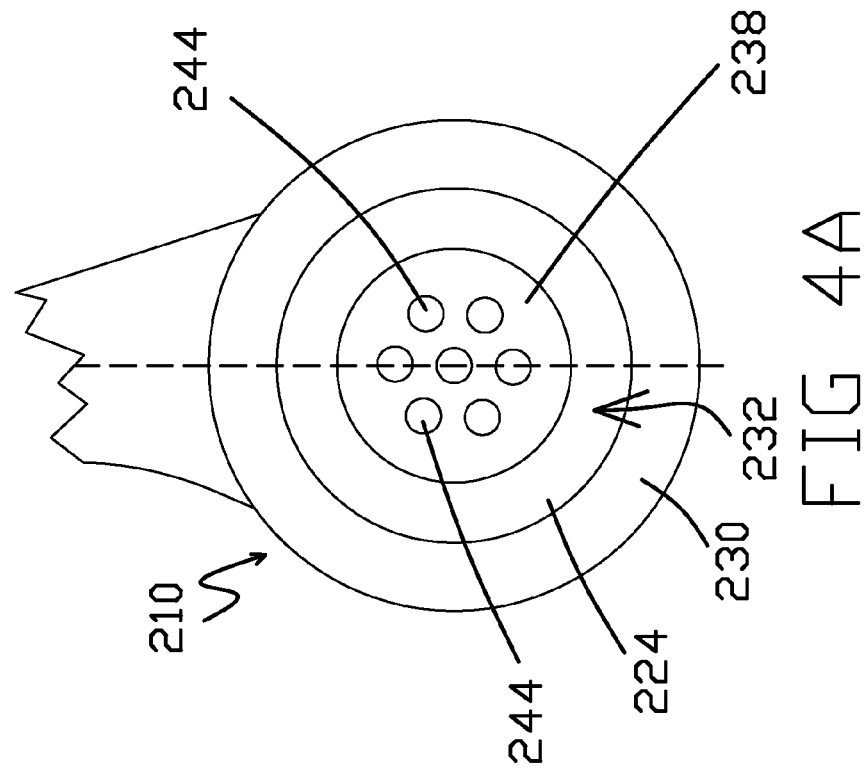
FIGS. 4A and 4B are bottom and sectional side views, respectively, of a paddle of a DSA suspension.
Figure 4B:
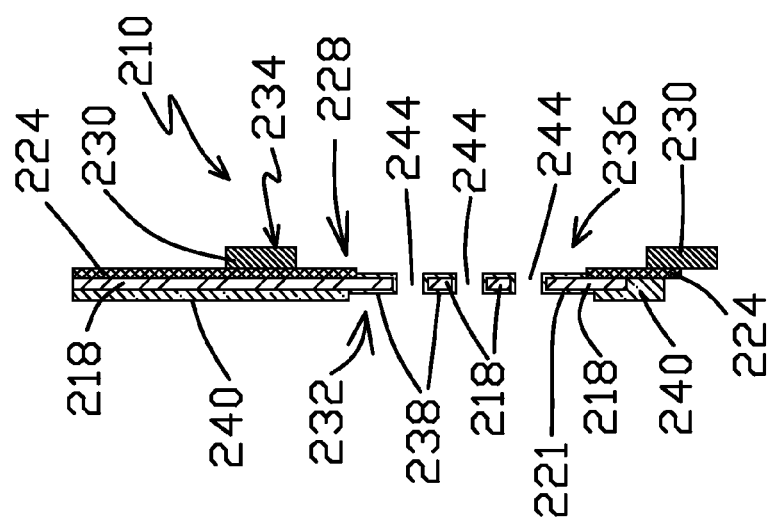

FIGS. 4A and 4B are bottom and sectional side views, respectively, of a paddle 210. The paddle 210 can be configured similarly to any other paddle disclosed herein except where noted. Features of the paddle 210 that are the same or similar to those of other embodiments are indicated by similar reference numbers. The paddle 210 includes a stainless steel base 230 that forms a ring-shaped member 234, a dielectric insulating layer 224 to which the stainless steel base 230 is attached, a trace 218 extending on the dielectric insulating layer 224, and a dielectric cover coat layer 240. The paddle 210 includes a contact pad 232 formed by a portion of the trace 218 on which is disposed a plated outer layer 238. The contact pad 232 includes a plurality of voids 244. The voids 244 can have sizes and shapes of the types described herein. For example, each opening may be sufficiently small to not permit conductive adhesive to flow from a cavity 228 partially formed by the ring-shaped member 234 to the top surface 221 of the contact pad 232. Alternatively, one or more (e.g., all) of the voids 244 may be large enough to permit conductive adhesive to move through the voids 244 from the bottom side access opening 236 to the top surface 221.

FIGS. 5A and 5B are bottom and sectional side views, respectively, of a paddle 310. The paddle 310 can be configured similarly to any other paddle disclosed herein except where noted. Features of the paddle 310 that are the same or similar to those of other embodiments are indicated by similar reference numbers. The paddle 310 includes a stainless steel base 330 that forms a ring-shaped member 334, a dielectric insulating layer 324 to which the stainless steel base 330 is attached, a trace 318 extending on the dielectric insulating layer 324, and a dielectric cover coat layer 340. The paddle 310 includes a contact pad 332 formed by a portion of the trace 318 on which is disposed a plated outer layer 338. The contact pad 332 includes a plurality of voids 344. As shown, each void 344 is an elongated slot-shaped opening that extends across the top surface 321 of the contact pad 332. As shown in FIG. 5A, the slot shaped voids 344 are arranged in a parallel pattern. Each slot shaped void 344 can have a width of about 10-20 µm, measured along the narrow dimension, to prevent conductive adhesive from flowing from the bottom side access opening 336 to the top surface 321 of the contact pad 332, as discussed herein. Wider slot shaped voids 344 can be provided, such as a slot shaped void 344 having a 30 µm or larger width, but it is noted that a tested 30 µm wide slot allowed some adhesive to escape entirely through the slot shaped voids 344 to the top surface 321, which risks unwanted sticking as discussed herein. Slot shaped voids 344 wider than 30 µm may allow more substantial adhesive passage entirely through the voids 344. While a plurality of slot shaped voids 344 are shown on the contact pad 332, a single slot shaped void 344 may alternatively be provided.

FIGS. 6A and 6B are bottom and sectional side views, respectfully, of a paddle 410. The paddle 410 can be configured similarly to any other paddle disclosed herein except where noted. Features of the paddle 410 that are the same or similar to those of other embodiments are indicated by similar reference numbers. The paddle 410 includes a stainless steel base 430 that forms a ring-shaped member 434, a dielectric insulating layer 424 to which the stainless steel base 430 is attached, a trace 418 extending on the dielectric insulating layer 424, and a dielectric cover coat layer 440. The paddle 410 includes a contact pad 432 formed by a portion of the trace 418 on which is disposed a plated outer layer 438. The contact pad 432 includes top surface 421 and a bottom surface 423 and a void 444 extending between the top surface 421 and the bottom surface 423. The bottom surface 423 of the contact pad 432 is exposed through the bottom side access opening 436 and the top surface 421 is exposed through the top side access opening 442. The bottom surface 423 and the top surface 421 are textured. Specifically, the bottom surface 423 and the top surface 421 are each uneven and rough, similar to sandpaper. Although both of the bottom surface 423 and the top surface 421 are textured in the illustrated embodiment, only one of the bottom surface 423 and the top surface 421 may be textured in some alternative embodiments. While the entirety of each of the bottom surface 423 and the top surface 421 are textured, only a limited portion of one or both of the bottom surface 423 and the top surface 421 may be textured while the remaining surface portions may be untextured (i.e. smooth) in various other embodiments. In some embodiments, the underlying trace 418 layer is textured such that the plated outer layer 438 disposed thereon also takes on a textured form, while in some other embodiments the underlying trace 418 is untextured (i.e. smooth) while the plated outer layer 438 is deposited or modified in a manner that forms a textured surface. Etching, photolithographic, and/or deposition processes can be used to provide surface texture. Photolithographic and deposition processes are disclosed in co-pending U.S. application Ser. No. 13/690,883, filed on Nov. 30, 2012 and entitled Microstructure Patterned Surfaces For Integrated Lead Disk Drive Head Suspensions, which is incorporated herein by reference in its entirety for all purposes. Surface texture as disclosed above provides more surface area for forming a mechanical and electrical connection (e.g., to conductive adhesive). It is noted that the disclosed surface texturing can be incorporated into any embodiment, and any surface, referenced herein.

Figure 7A:
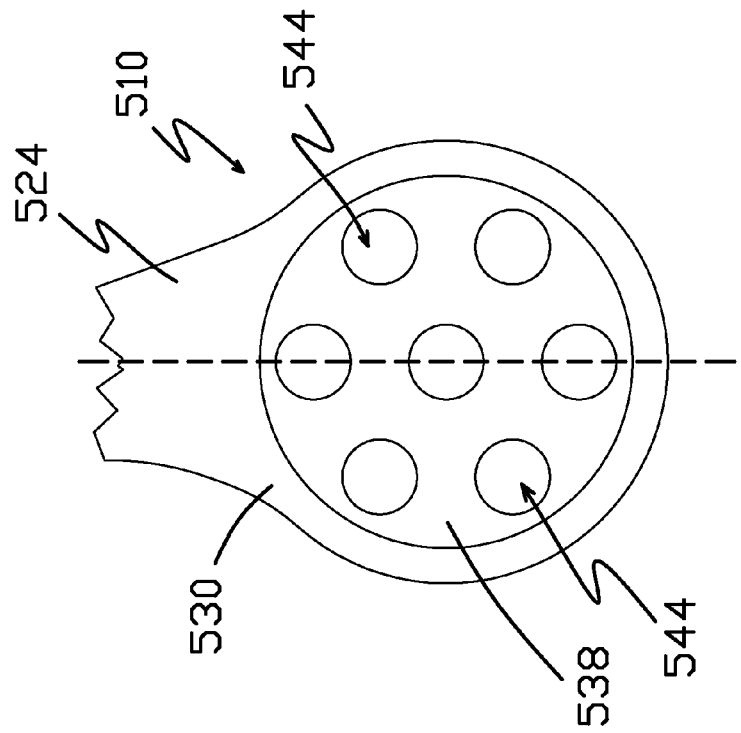
FIGS. 7A and 7B are bottom and side sectional views, respectively, of a paddle of a DSA suspension.
Figure 7B:
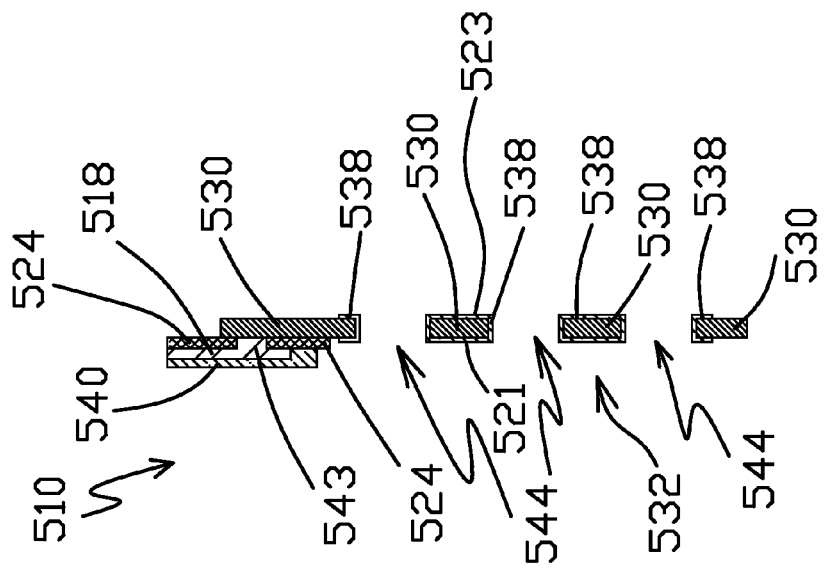

FIGS. 7A and 7B are bottom and side sectional views, respectively, of a paddle 510. The paddle 510 can be configured similarly to any other paddle disclosed herein except where noted. Features of the paddle 510 that are the same or similar to those of other embodiments are indicated by similar reference numbers. The paddle 510 includes a stainless steel base 530, a dielectric insulating layer 524 to which the stainless steel base 530 is attached, a trace 518 extending on the dielectric insulating layer 524, and a dielectric cover coat layer 540. The paddle 510 includes a contact pad 532 formed by a portion of the stainless steel base 530 on which is disposed a plated outer layer 538. In some embodiments, the contact pad 532 may not include a trace 518 (i.e. the flexure trace 518 may not overlap the contact pad 532). The stainless steel base 530 is electrically coupled to the trace 518 by a conductive via 543 that extends from the trace 518 to the stainless steel base 530 through the dielectric insulating layer 524. While in various embodiments described above, the stainless steel base is not electrically connected to the trace by a structural component conductor of the paddle, the stainless steel base 530 is electrically coupled to the trace 518 by a structural component conductor in the embodiment of FIGS. 7A-B, the via 543 specifically.

The stainless steel base 530 forms a contact pad 532 that includes a plurality of voids 544 that extend through the stainless steel base 530 from a bottom surface 523 to a top surface 521. The plated outer layer 538 on the stainless steel base 530 extends along the walls of the stainless steel base 530 that define the voids 544. The plated outer layer 538 can be nickel and/or gold, for example. Dielectric cover coat layer 540 extends over portions of the paddle 510 (much of which is not shown in FIGS. 7A-B), including over the trace 518 and the via 543. The numbers, sizes, and shapes of the voids 544 can vary depending upon the intended application and can be consistent with other embodiments disclosed herein (e.g., sufficiently small to prohibit passage of conductive adhesive fully therethrough). In some embodiments, relatively large voids 544 can enhance mechanical adhesion by allowing adhesive to flow through the voids 544 and onto the top surface 521 of the contact pad 532 and form rivet structures. Smaller voids 544 that allow the adhesive to flow into the voids 544 but not entirely through the voids 544 can balance enhanced adhesion with efficient manufacturing as described above.

Figure 8C:
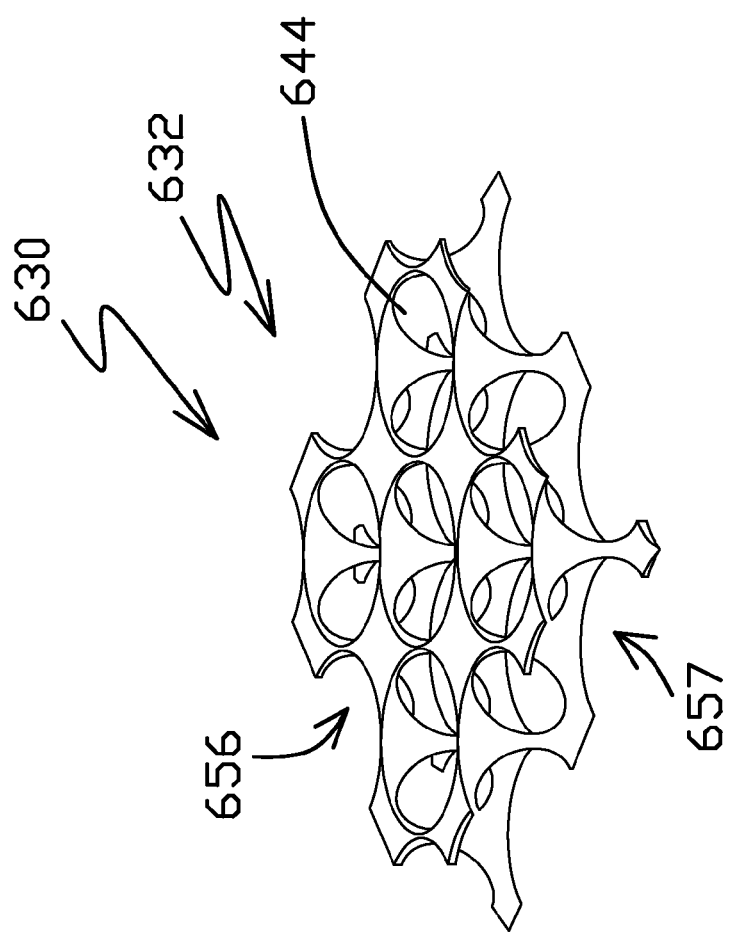
FIG. 8C is a perspective view of a portion of the paddle of FIGS. 8A and 8B.

FIGS. 8A and 8B are top and side sectional views, respectively, of a paddle 610. FIG. 8C is a detailed isometric illustration of a portion of the contact pad 632. The paddle 610 can be configured similarly to any other paddle disclosed herein except where noted. Features of the paddle 610 that are the same or similar to those of other embodiments are indicated by similar reference numbers. The paddle 610 includes a stainless steel base 630, a dielectric insulating layer 624 to which the stainless steel base 630 is attached, a trace 618 extending on the dielectric insulating layer 624, and a dielectric cover coat layer 640. The paddle 610 includes a contact pad 632 formed by a portion of the stainless steel base 630 on which is disposed a plated outer layer 638. As shown, the contact pad 632 does not include a trace 618. The stainless steel base 630 is electrically coupled to the trace 618 by a conductive via 643 that extends from the trace 618 to the stainless steel base 630 through the dielectric insulating layer 624.

As shown, the contact pad 632 has three-dimensional voids 644 to form a "foam" or "honeycomb" structure. The voids 644 are formed by a plurality of depressions 656 formed in the top surface 621 in a first grid pattern. The plurality of depressions 656 are sunken into the top surface 621. For example, each of the plurality of depressions 656 can be hemispherically shaped. The voids 644 are further formed by a plurality of depressions 657 formed in the bottom surface 623 in a second grid pattern. The plurality of depressions 657 are sunken into the bottom surface 623. For example, each of the plurality of depressions 657 can be hemispherically shaped. The plurality of depressions 656 in the top surface 621 can connect to the plurality of depressions 657 in the bottom surface 623 to form the voids 644 that extend from the top surface 621 to the bottom surface 623. The first grid pattern can be the same as the second grid pattern (e.g., in layout and spacing) but the first grid pattern can be offset from the second grid pattern (e.g., by 180° in the illustrated embodiment) such that no depression 656 on the top surface 621 is axially aligned with any depression 657 of the bottom surface 623. In this way, the sides, and not the bottoms of the hemisphericaly shaped depressions 656, 657, connect to one another. The voids 644 can be formed by partial etching both the top surface 621 and the bottom surface 623 through masks with apertures that are offset by one another. The contact pad 632 can provide enhanced adhesion and electrical characteristics by enabling the conductive adhesive to partially or completely flow into the voids 644 and form multiple rivet structures.

FIGS. 9A and 9B are bottom and side sectional views, respectively, of a paddle 710. The paddle 710 can be configured similarly to any other paddle disclosed herein except where noted. Features of the paddle 710 that are the same or similar to those of other embodiments are indicated by similar reference numbers. The paddle 710 includes a stainless steel base 730, a dielectric insulating layer 724 to which the stainless steel base 730 is attached, a trace 718 extending on the dielectric insulating layer 724, and a dielectric cover coat layer 740. The paddle 710 includes a contact pad 732 formed by a portion of the trace 718 on which is disposed a plated outer layer 738. The contact pad 732 includes a top surface 721 and a bottom surface 723.

The stainless steel base 730 includes a center region 731 and an outer ring-shaped member 733 separated by a gap 737. The stainless steel base 730 is electrically isolated from the contact pad 732 (formed by the trace 718 and the plated outer layer 738) by the dielectric insulating layer 724. The stainless steel base 730 defines a bottom side access opening 736 inside the ring-shaped member 733. Portions of the bottom surface 723 of the contact pad 732 are exposed within the bottom side access opening 736. A dielectric cover coat layer 740 overlays the trace 718. A top side access opening 742 on the top side of the contact pad 732 is free from the dielectric cover coat layer 740 to enable electrical contact to the top side of the contact pad 732. A plurality of voids 744 extend through the contact pad 732 (including through the dielectric insulating layer 724 and the stainless steel base 730 in the illustrated embodiment). In the embodiment shown in FIGS. 9A and 9B, the voids 744 are generally circular. Base island structures 727 are formed by the dielectric insulating layer 724 and are located between some of the voids 744 in the center region 731. Further island structures 725 are formed from the stainless steel base 730 in the center region 731, the island structures 725 respectively located on the base island structures 727. In the illustrated embodiment, the island structures 725 and 727 are generally circular, and the base island structures 727 in the dielectric insulating layer 724 have a larger diameter than the island structures 725 in the stainless steel base 730, although the island structures 725 and 727 can take other numbers, shapes, and sizes in other embodiments. The island structures 725 and 727 provide features into which conductive adhesive can integrate (e.g., partially surround), the island structures 725 and 727 thereby increasing the surface area for mechanical connection. The voids 744 can provide enhanced mechanical adhesion by enabling the formation of rivet structures and by enabling bonding to the stainless steel base 730 and the dielectric insulating layer 724 in the voids 744. Alternative embodiments include not having any voids 744 in the contact pad 732 and/or not including the island structures 725 and 727.

FIGS. 10A and 10B are bottom and side sectional views, respectively, of a paddle 810. The paddle 810 can be configured similarly to any other paddle disclosed herein except where noted. Features of the paddle 810 that are the same or similar to those of other embodiments are indicated by similar reference numbers. The paddle 810 includes a stainless steel base 830 that forms a ring-shaped member 834, a dielectric insulating layer 824 to which the stainless steel base 830 is attached, a trace 818 extending on the dielectric insulating layer 824, and a dielectric cover coat layer 840. The paddle 810 includes a contact pad 832 formed by a portion of the trace 818 on which is disposed a plated outer layer 838. The stainless steel base 830 defines a bottom side access opening 836 inside the ring-shaped member 834. The bottom side access opening 836 provides access to a cavity 828 on the bottom side of the paddle 810, the cavity 828 defined by the contact pad 832 and the ring-shaped member 834, the cavity 828 being open on the bottom side of the paddle 810 by the bottom side access opening 836 but not being open on the top side of the paddle 810. The stainless steel base 830 is electrically coupled to the trace 818 by a conductive via 843 extending from the trace 818 to the stainless steel base 830 through the dielectric insulating layer 824. Other portions of the stainless steel base 830 are separated from the contact pad 832 by the dielectric insulating layer 824. The bottom surface 823 of the contact pad 832 is exposed within the bottom side access opening 836. A top side access opening 842 on the top side of the contact pad 832 (e.g., the central portion in the illustrated embodiment) exposes the top surface 821 of the contact pad 832 to enable electrical contact to the top side of the contact pad 832.

FIGS. 11A and 11B are bottom and sectional side views, respectively, of a paddle 910. The paddle 910 can be configured similarly to any other paddle disclosed herein except where noted. Features of the paddle 910 that are the same or similar to those of other embodiments are indicated by similar reference numbers. The paddle 910 includes a stainless steel base 930 that forms a partial ring-shaped member 934, a dielectric insulating layer 924 to which the stainless steel base 930 is attached, a trace 918 extending on the dielectric insulating layer 924, and a dielectric cover coat layer 940. The stainless steel base 930 is electrically isolated from the contact pad 932 and trace 918 by the dielectric insulating layer 924. The paddle 910 includes a contact pad 932 formed by a portion of the trace 918 on which is disposed a plated outer layer 938. The stainless steel base 930 defines a bottom side access opening 936 inside the partial ring-shaped member 934. The bottom side access opening 936 provides access to a cavity 928 on the bottom side of the paddle 910, the cavity 928 defined by the contact pad 932 and the partial ring-shaped member 934, the cavity 928 being open on the bottom side of the paddle 910 by the bottom side access opening 936 and on a side by gap 935 in the partial ring-shaped member 934, but not being open on the top side of the paddle 910. The contact pad 932 does not include a void forming a passage through the contact pad 932. As such, the top side of the paddle 910 does not have a hole that connects with a cavity 928 of the paddle 910. Because of the gap 935, the partial ring-shaped member 934 is semicircular or open. In other embodiments, the gap 935 is larger or smaller than that shown. The gap 935 allows adhesive to flow out of the lateral side of the partial ring-shaped member 934 to allow air and/or excess adhesive to escape the cavity 928 while avoiding having the adhesive flow to the top of the paddle 910 where the adhesive may come into contact with precision machine tooling.

FIGS. 12A and 12B are top and sectional side views, respectively, of a paddle 1010. The paddle 1010 can be configured similarly to any other paddle disclosed herein except where noted. Features of the paddle 1010 that are the same or similar to those of other embodiments are indicated by similar reference numbers. The paddle 1010 includes a stainless steel base 1030 that forms a closed ring-shaped member 1034, a dielectric insulating layer 1024 to which the stainless steel base 1030 is attached, a trace 1018 extending on the dielectric insulating layer 1024, and a dielectric cover coat layer 1040. The stainless steel base 1030 is electrically isolated from the contact pad 1032 and trace 1018 by the dielectric insulating layer 1024. The paddle 1010 includes a contact pad 1032 formed by a portion of the trace 1018 on which is disposed a plated outer layer 1038. The stainless steel base 1030 defines a bottom side access opening 1036 inside the closed ring-shaped member 1034. The bottom side access opening 1036 provides access to a void 1044 that extends though the paddle 1010 to a top side access opening 1042 on the top side of the paddle 1010, the void 1044 defined by the contact pad 1032 and the closed ring-shaped member 1034. The bottom surface 1023 of the contact pad 1032 is exposed within the bottom side access opening 1036.

In embodiment shown in FIGS. 12A and 12B, the contact pad 1032 includes a leg 1033 that extends across the bottom side access opening 1036 and the top side access opening 1042, and a leg 1035 that extends around the bottom side access opening 1036 and the top side access opening 1042 on the dielectric insulating layer 1024. The leg 1033 extends generally across the center of the bottom side access opening 1036 in the illustrated embodiment, but can be located at other positions in various other embodiments. The leg 1033 is out of the plane with respect to the contact pad 1032. At least a portion of the leg 1033 is in plane with the stainless steel base 1230. In other embodiments the leg 1033 can be formed out of the plane of other portions of the contact pad 1032 to greater and lesser amounts (e.g., fully into the plane of the stainless steel base 1030). The leg 1035 is semicircular in the embodiment shown in FIG. 12A. The leg 1033 is shown as flying (e.g., partially unsupported) over the contact pad 1032. The raised position of the leg 1033 can allow conductive adhesive to flow fully around, including underneath, that portion of the contact pad 1032 to create a mechanical lock into the adhesive when the paddle 1010 is bonded to a motor.

FIGS. 13A and 13B are bottom and sectional side views, respectively, of a paddle 1110. The paddle 1110 can be configured similarly to any other paddle disclosed herein except where noted. Features of the paddle 1110 that are the same or similar to those of other embodiments are indicated by similar reference numbers. The paddle 1110 includes a stainless steel base 1130 that forms a ring-shaped member 1134, a dielectric insulating layer 1124 to which the stainless steel base 1130 is attached, a trace 1118 extending on the dielectric insulating layer 1124, and a dielectric cover coat layer 1140. The paddle 1110 includes a contact pad 1132 formed by a portion of the trace 1118 on which is disposed a plated outer layer 1138. The stainless steel base 1130 defines a bottom side access opening 1136 inside the ring-shaped member 1134. The bottom side access opening 1136 provides access to a cavity 1128 on the bottom side of the paddle 1110, the cavity 1128 defined by the contact pad 1132 and the ring-shaped member 1134, the cavity 1128 being open on the bottom side of the paddle 1110 by the bottom side access opening 1136 but not being open on the top side or the side of the paddle 1110. The stainless steel base 1130 is electrically coupled to the trace 1118 by a conductive via 1143 extending from the trace 1118 to the stainless steel base 1130 through the dielectric insulating layer 1124. Other portions of the stainless steel base 1130 are separated from the contact pad 1132 by the dielectric insulating layer 1124. A metal plating layer 1145 is disposed on the stainless steel base 1130. The metal plating layer 1145 can be any type of plating disclosed herein, such as gold and/or nickel, for example. The bottom surface 1123 of the contact pad 1132 is exposed within the bottom side access opening 1136.

As shown, portions of the dielectric insulating layer 1124 are located along the bottom surface 1123 of the contact pad 1132. The portions of the dielectric insulating layer 1124 can form island structures 1125, which can comprise dots, rings or other features patterned on the bottom surface 1123 of the contact pad 1132. The island structures 1125 increase adhesion of conductive adhesive by bonding to the island structures 1125 while providing enhanced electrical contact through bonding to the plated outer layer 1138.

FIGS. 14A and 14B are bottom and sectional side views, respectively, of a paddle 1210. The paddle 1210 can be configured similarly to any other paddle disclosed herein except where noted. Features of the paddle 1210 that are the same or similar to those of other embodiments are indicated by similar reference numbers. The paddle 1210 includes a stainless steel base 1230 that forms a closed ring-shaped member 1234, a dielectric insulating layer 1224 to which the stainless steel base 1230 is attached, a trace 1218 extending on the dielectric insulating layer 1224, and a dielectric cover coat layer 1240. The paddle 1210 includes a contact pad 1232 formed by a portion of the trace 1218 on which is disposed a plated outer layer 1238. The stainless steel base 1230 defines a bottom side access opening 1236 inside the ring-shaped member 1234. The bottom side access opening 1236 provides access to a cavity 1228 on the bottom side of the paddle 1210, the cavity 1228 defined by the contact pad 1232 and the ring-shaped member 1234, the cavity 1228 being open on the bottom side of the paddle 1210 by the bottom side access opening 1236 but not being open on the top side or the side of the paddle 1210. The stainless steel base 1230 is electrically coupled to the trace 1218 by a conductive via 1243 extending from the trace 1218 to the stainless steel base 1230 through the dielectric insulating layer 1224. Other portions of the stainless steel base 1230 are separated from the contact pad 1232 by the dielectric insulating layer 1224. A metal plating layer 1245 is disposed on the stainless steel base 1230. Specifically, the metal plating layer 1245 can be disposed on the entirety of the bottom and lateral sides of the stainless steel base 1230 such that, together with the via 1243 and the dielectric insulating layer 1224, no surface of the stainless steel base 1230 is directly exposed along the paddle 1210. The bottom surface 1223 of the contact pad 1232 is exposed within the bottom side access opening 1236.

As shown in FIG. 14B, and unlike various other embodiments presented herein, the bottom side access opening 1236 does not provide access to the bottom side of the contact pad 1232. The dielectric insulating layer 1224 extends across the entire bottom surface of the contact pad 1232 within the bottom side access opening 1236, such that the bottom side of the contact pad 1232 is not exposed through the bottom side access opening 1236. A top side access opening 1242 on the top side of the contact pad 1232 (e.g., the central portion in the illustrated embodiment) is free from the dielectric cover coat layer 1240 or other dielectric material and is exposed on the top side of the paddle 1210 to enable electrical contact to the contact pad 1232. The bottom side of the paddle 1210 can also serve as an electrical connection to the trace 1218 through the plated stainless steel base 1230.

FIGS. 15A and 15B are bottom and side sectional views, respectively, of a paddle 1310. As shown, the paddle 1310 includes a stainless steel base 1330 that forms a closed ring-shaped member 1334, a dielectric insulating layer 1324, a trace 1318, a dielectric cover coat layer 1340, a conductive via 1343, and a contact pad 1332 formed by a portion of the trace 1318 on which is disposed a plated outer layer 1338. The paddle 1310 can be configured similarly to any other paddle disclosed herein except where noted. In particular, the paddle 1310 can be configured similarly to the paddle 1210 except that instead of the metal plating layer 1345 being disposed on the entirely of the bottom and lateral side surfaces of the stainless steel base 1330 as in the embodiment of FIGS. 14A-B, the metal plating layer 1345 only forms a ring on the bottom of the ring-shaped member 1334. The metal plating layer 1345 is a patterned ring-shaped member that has a width less than the width of the ring-shaped member 1334 of the stainless steel base 1330. Other areas of the bottom and lateral sides of the stainless steel base 1330 of the paddle 1310, not covered by the metal plating layer 1345, are exposed, however these areas could be covered by a dielectric material (e.g., a polymer). The conductive metal plating layer 1345 provides a stable, high conductivity surface on the stainless steel base 1330 to conduct electrical energy to the stainless steel base 1330 without the need to plate all exposed surfaces of the stainless steel base 1330. While a single ring of metal plating layer 1345 is shown, other embodiments can include more than one ring (e.g., concentric rings on the bottom of the ring-shaped member 1334). Additionally or alternatively, the structure of plating layer 1345 can take other shapes and configurations, such as an oval or square shape.

FIGS. 16A and 16B are bottom and side sectional views, respectively, of a paddle 1410. The paddle 1410 can be configured similarly to any other paddle disclosed herein except where noted. Features of the paddle 1410 that are the same or similar to those of other embodiments are indicated by similar reference numbers. The paddle 1410 includes a stainless steel base 1430 that forms a solid plate without holes therethrough or patterning formed within the stainless steel base 1430 (i.e. depressions). The stainless steel base 1430 is generally circular as shown, however other shapes are possible. The paddle 1410 further includes a dielectric insulating layer 1424 to which the stainless steel base 1430 is attached, a trace 1418 extending on the dielectric insulating layer 1424, and a dielectric cover coat layer 1440. The paddle 1410 includes a contact pad 1432 formed by a portion of the trace 1418 on which is disposed a plated outer layer 1438. The stainless steel base 1430 is electrically coupled to the trace 1418 by a conductive via 1443 extending from the trace 1418 to the stainless steel base 1430 through the dielectric insulating layer 1424. Other portions of the stainless steel base 1430 are separated from the contact pad 1432 by the dielectric insulating layer 1424. A metal plating layer 1445 is disposed on the stainless steel base 1430 in a plurality of separated layer sections 1447 on the bottom of the stainless steel base 1430. In the embodiment shown in FIGS. 16A-B, the plurality of separated layer sections 1447 are formed into a plurality of concentric circles. The plurality of concentric circles forms alternating sections of stainless steel base 1430 material and metal plating layer 1445 material along the radius of the stainless steel base 1430. Other areas of the bottom and lateral sides of the stainless steel base 1430 of the paddle 1410, not covered by the metal plating layer 1445, are exposed, however these areas could be covered by a dielectric material (e.g., a polymer). The conductive metal plating layer 1445 provides a stable, high conductivity surface on the stainless steel base 1430 to conduct electrical energy to the stainless steel base 1430 without the need to plate all exposed surfaces of the stainless steel base 1430. The shape of the plurality of separated layer sections 1447 can take other shapes and configurations, such as ovals or squares.

Figure 17A:
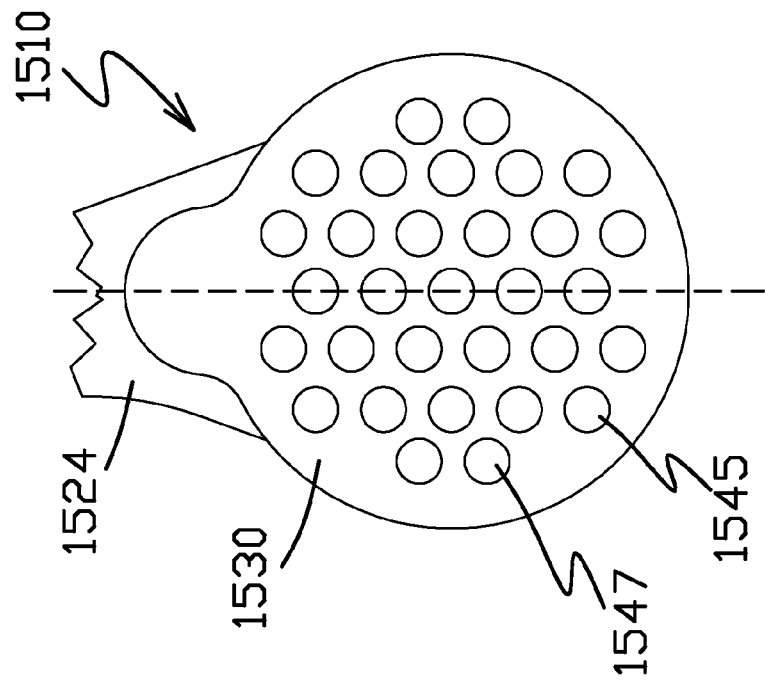
FIGS. 17A and 17B are bottom and side sectional views, respectively, of a paddle of a DSA suspension.
Figure 17B:
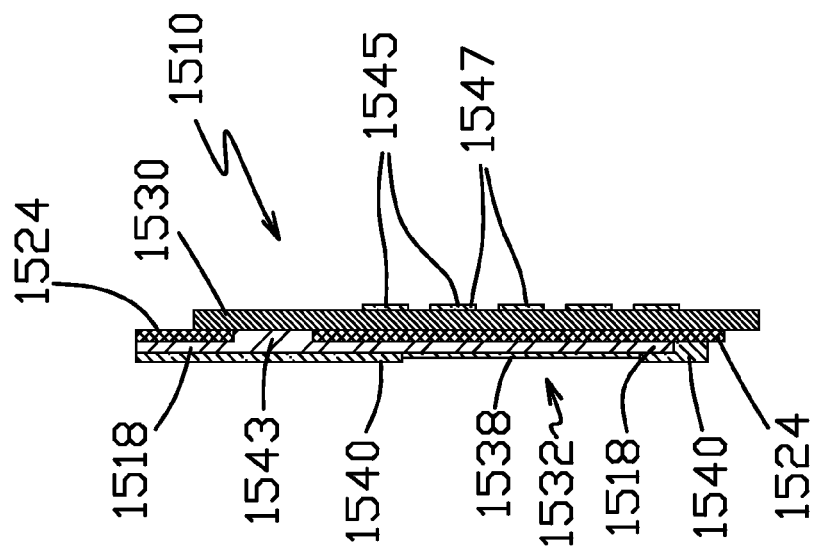

FIGS. 17A and 17B are bottom and side sectional views, respectively, of a paddle 1510. The paddle 1510 can be configured similarly to any other paddle disclosed herein except where noted. Features of the paddle 1510 that are the same or similar to those of other embodiments are indicated by similar reference numbers. The paddle 1510 includes a stainless steel base 1530 that forms a solid plate without holes therethrough or patterning formed within the stainless steel base 1530 (i.e. depressions). The stainless steel base 1530 is generally circular as shown, however other shapes are possible. The paddle 1510 further includes a dielectric insulating layer 1524 to which the stainless steel base 1530 is attached, a trace 1518 extending on the dielectric insulating layer 1524, and a dielectric cover coat layer 1540. The paddle 1510 includes a contact pad 1532 formed by a portion of the trace 1518 on which is disposed a plated outer layer 1538. The stainless steel base 1530 is electrically coupled to the trace 1518 by a conductive via 1543 extending from the trace 1518 to the stainless steel base 1530 through the dielectric insulating layer 1524. Other portions of the stainless steel base 1530 are separated from the contact pad 1532 by the dielectric insulating layer 1524. A metal plating layer 1545 is disposed on the stainless steel base 1530 in a plurality of separated layer sections 1547 on the bottom of the stainless steel base 1530. In the embodiment shown in FIGS. 17A-B, the plurality of separated layer sections 1547 are formed into a plurality of separated elements in a grid pattern. Each of the elements is shown as a circle formed from the metal plating layer 1545 material. The shape of the plurality of separated layer sections 1547 can take other patterns, and the elements of the separated sections 1547 themselves can take on other shapes (e.g., ovals, squares). Other areas of the bottom and lateral sides of the stainless steel base 1530 of the paddle 1510, not covered by the metal plating layer 1545, are exposed, however these areas could be covered by a dielectric material.

Figure 18A:
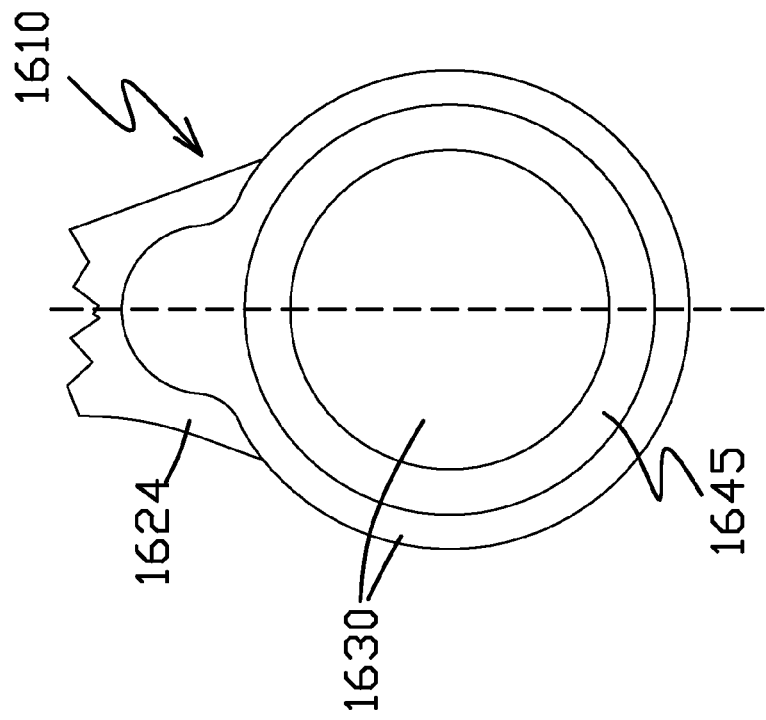
FIGS. 18A and 18B are bottom and side sectional views, respectively, of a paddle of a DSA suspension.
Figure 18B:
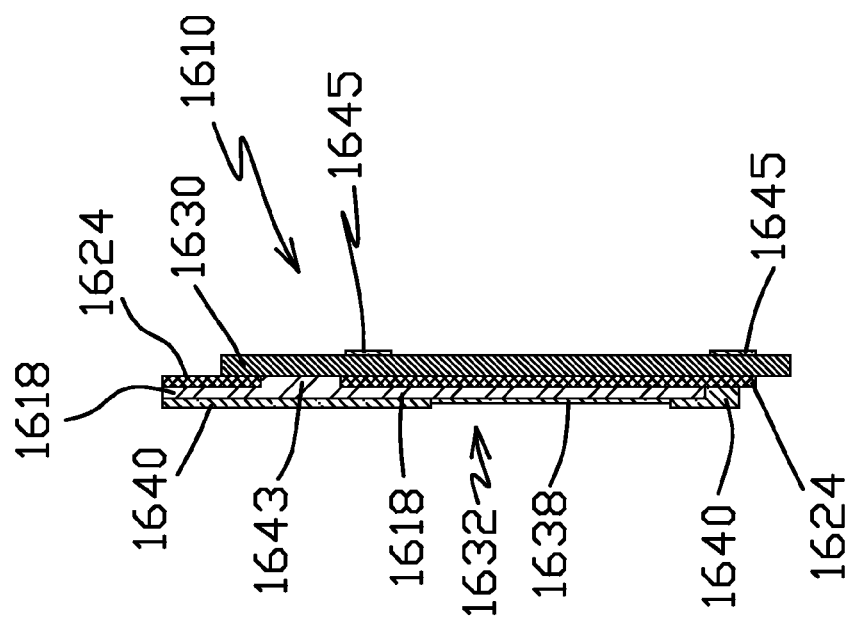

FIGS. 18A and 18B are bottom and side sectional views, respectively, of a paddle 1610. The paddle 1610 includes a stainless steel base 1630 that forms a solid plate without holes therethrough or patterning formed within the stainless steel base 1630 (i.e. depressions). The stainless steel base 1630 is generally circular as shown, however other shapes are possible. The paddle 1610 further includes a dielectric insulating layer 1624 to which the stainless steel base 1630 is attached, a trace 1618 extending on the dielectric insulating layer 1624, and a dielectric cover coat layer 1640. The paddle 1610 includes a contact pad 1632 formed by a portion of the trace 1618 on which is disposed a plated outer layer 1638. The stainless steel base 1630 is electrically coupled to the trace 1618 by a conductive via 1643 extending from the trace 1618 to the stainless steel base 1630 through the dielectric insulating layer 1624. Other portions of the stainless steel base 1630 are separated from the contact pad 1632 by the dielectric insulating layer 1624. A metal plating layer 1645 is disposed on the stainless steel base 1630. The metal plating layer 1645 forms a single ring on the bottom of the stainless steel base 1630. The stainless steel base 1630 is exposed on an outer periphery (e.g., radially beyond the metal plating layer 1645) on the bottom of the stainless steel base 1630. The stainless steel base 1630 is exposed interiorly of the circular metal plating layer 1645 on the bottom of the stainless steel base 1630. For example, the center of the stainless steel base 1630 is not plated and is exposed. While a single ring of metal plating layer 1645 is shown, other embodiments can include more than one ring (e.g., concentric rings) of the metal plating layer 1645. Additionally or alternatively, the structure of metal plating layer 1645 can take other shapes and configurations, such as an oval or square shape.

FIGS. 19A and 19B are bottom and side sectional views, respectively, of a paddle 1710. The paddle 1710 further includes a stainless steel base 1730, dielectric insulating layer 1724 to which the stainless steel base 1730 is attached, a trace 1718 extending on the dielectric insulating layer 1724, and a dielectric cover coat layer 1740. The paddle 1710 includes a contact pad 1732 formed by a portion of the trace 1718 on which is disposed a plated outer layer 1738. The stainless steel base 1730 is electrically coupled to the trace 1718 by a conductive via 1743 extending from the trace 1718 to the stainless steel base 1730 through the dielectric insulating layer 1724. Other portions of the stainless steel base 1730 are separated from the contact pad 1732 by the dielectric insulating layer 1724.

The stainless steel base 1730 of the paddle 1710 forms a plurality of separate elements. The plurality of separate elements include an outer element 1717 and an inner element 1715 that is co-planar with the outer element 1717. Specifically, the inner element 1715 is an inner circular element while the outer element 1717 fully surrounds the inner element 1715. In this way, the outer element 1717 forms a ring around the inner element 1715. The outer element 1717 is separated from the inner element 1715 by a gap 1775, which itself forms a ring around the inner element 1715. The gap 1775 forms a bottom side opening 1739. The gap 1775 exposes the dielectric insulating layer 1724 to the bottom side opening 1739. A metal plating layer 1745 is disposed on the stainless steel base 1730. Specifically, the metal plating layer 1745 forms a single ring on the outer element 1717. While the metal plating layer 1745 forms a single element on the stainless steel base 1730, specifically a ring on the outer element 1717, the metal plating layer 1745 can additionally or alternatively include more ring and/or other shapes on the bottom side of the outer element 1717 and/or the inner element 1715. In some alternative embodiments, a plating layer, not shown in the illustrated embodiment but similar to the metal plating layer 1745, can be disposed on the inner element 1715. Such plating layer may entirely cover the bottom and/or lateral sides of the inner element 1715 or may be a single strip or multiple strips on the bottom side of the inner element 1715. Additionally or alternatively, a conductive via, not shown in the illustrated embodiment but similar to the conductive via 1743, may extend from the trace 1718 to the inner element 1715 through the dielectric insulating layer 1724 to electrically connect the inner element 1715 to the trace 1718.

FIGS. 20A and 20B are top and side sectional views, respectively, of a paddle 1810. The paddle 1810 can be configured similarly to any other paddle disclosed herein except where noted. Features of the paddle 1810 that are the same or similar to those of other embodiments are indicated by similar reference numbers. The paddle 1810 includes a stainless steel base 1830, a dielectric insulating layer 1824 to which the stainless steel base 1830 is attached, a trace 1818 extending on the dielectric insulating layer 1824, and a dielectric cover coat layer 1840. The stainless steel base 1830 is electrically coupled to the trace 1818 by a conductive via 1843 extending from the trace 1818 to the stainless steel base 1830 through the dielectric insulating layer 1824. Other portions of the stainless steel base 1830 are separated from the contact pad 1832 by the dielectric insulating layer 1824. The paddle 1810 includes a contact pad 1832 formed by a portion of the trace 1818 on which is disposed a plated outer layer 1838. A bottom surface 1823 of the contact pad 1832 is exposed through the bottom side access opening 1836 and the top surface 1821 is exposed through the top side access opening 1842. The bottom side access opening 1836 provides access to a cavity 1828 on the bottom side of the paddle 1810, the cavity 1828 defined by the contact pad 1832 and the stainless steel base 1830. The stainless steel base 1830 forms a ring-shaped member 1834. Each of the dielectric insulating layer 1824 and the dielectric cover coat layer 1840 form a broken ring that has a plurality of separated segments, the separation between the segments creating gaps 1837 which provide access to the cavity 1828 from the lateral sides of the paddle 1810. A metal plating layer 1845 is disposed on the bottom side of the stainless steel base 1830.

As shown in FIGS. 20A and 20B, the dielectric insulating layer 1824 at the contact pad 1832 is patterned or otherwise formed to include gaps 1837 in the plane of the dielectric insulating layer 1824. The gaps 1837 are located to provide open space between the stainless steel base 1830 and the contact pad 1832 vertically, and between the separated segments of the dielectric insulating layer 1824 laterally. When the paddle 1810 is being bonded to a motor (e.g., such as motor 16 shown in FIG. 1C), conductive adhesive can flow into the gaps 1837 between the stainless steel base 1830 and the contact pad 1832 to form a rivet-type structure that can increase the mechanical adhesion of the paddle 1810 to the motor 16.

FIGS. 21A and 21B are bottom and side sectional views, respectively, of a paddle 1910. As shown, the paddle 1910 includes a conductive metal contact 1920 having a contact pad 1932. The paddle 1910 includes an island 1976 on the connection portion 1922 adjacent the conductive metal contact 1920. In the illustrated embodiment, the island 1976 is formed in the stainless steel base layer 1930 of the flexure 1908, on the side of the dielectric insulating layer 1924 opposite the trace 1918. The dielectric insulating layer 1924 has an aperture at the conductive metal contact 1920 that defines a bottom side access opening 1936. The bottom surface 1923 of the contact pad 1932 is exposed within the bottom side access opening 1936. A dielectric cover coat 1940 overlays the trace 1918 around the contact pad 1932. A top side access opening 1942 on the top side of the contact pad 1932 (e.g., the central portion in the illustrated embodiment) is free from the dielectric cover coat layer 1940 to expose the contact pad 1932 to enable electrical contact to the top side of the contact pad 1932. In the illustrated embodiment, the top surface 1921 of the contact pad 1932 has a plated outer layer 1938. The island 1976 forms a wetting dam that can prevent conductive adhesive from wicking toward and making undesired electrical connection to other stainless steel portions of the flexure 1908.

FIGS. 22A and 22B are bottom and side sectional views, respectively, of a paddle 2010. The paddle 2010 includes a stainless steel base 2030 that forms a plate. The plate of the stainless steel base 2030 is generally circular as shown, however other shapes are possible. The paddle 2010 further includes a dielectric insulating layer 2024 to which the stainless steel base 2030 is attached, a trace 2018 extending on the dielectric insulating layer 2024, and a dielectric cover coat layer 2040. The paddle 2010 includes a contact pad 2032 formed by a portion of the trace 2018 on which is disposed a plated outer layer 2038. The stainless steel base 2030 is electrically coupled to the trace 2018 by a conductive via 2043 extending from the trace 2018 to the stainless steel base 2030 through the dielectric insulating layer 2024. Other portions of the stainless steel base 2030 are separated from the contact pad 2032 by the dielectric insulating layer 2024. A metal plating layer 2045 is disposed on the stainless steel base 2030. The metal plating layer 2045 forms a single ring on the bottom of the stainless steel base 2030. More rings and/or other shapes can additionally or alternatively be formed on the bottom of the stainless steel base 2030. The stainless steel base 2030 is exposed on an outer periphery (e.g., radially beyond the metal plating layer 2045) on the bottom of the stainless steel base 2030 of the paddle 2010. The stainless steel base 2030 is exposed interiorly of the circular metal plating layer 2045 on the bottom of the stainless steel base 2030. For example, portions of the stainless steel base 2030 are not plated and are exposed. While a single ring of metal plating layer 2045 is shown, other embodiments can include more than one ring (e.g., concentric rings). Additionally or alternatively, the structure of plating layer 2045 can take other shapes and configurations, such as an oval or square shape.

As shown in FIGS. 22A-B, the bottom of the stainless steel base 2030 includes a center region 2053 having a plurality of recesses 2052 that can, for example, be formed by partial etching. The recesses 2052 are sunken into the bottom surface 2023 of the stainless steel base 2030. The recesses 2052 are shown as hemispherical in shape, although other shapes are possible. Although not shown, the stainless steel base 2030 can be plated within the recesses 2052. The recesses 2052 can be arranged in a grid pattern. The recesses 2052 do not extend entirely though the stainless steel base 2030 (i.e. from the bottom side to the top side). The recesses 2052 increase the surface area of the stainless steel base 2030 and provide features to facilitate attachment to conductive adhesive. In various alternative embodiments, each recess 2052 can be replaced with a protrusion that extends outward from the otherwise flat bottom surface 2023 of the stainless steel base 2030.

Although the present invention has been described with reference to preferred embodiments, those skilled in the art will recognize that changes can be made in form and detail without departing from the spirit and scope of the invention. For example, the various features of the illustrated embodiments can be combined with features of other embodiments. As such, the various embodiments disclosed herein can be modified in view of the features of other embodiments, such as by omitting and/or adding features.

The following is claimed:

1. A dual stage actuation (DSA) flexure having a motor contact paddle for connecting to a terminal of a piezoelectric motor, the flexure comprising:
    a paddle comprising a top side and a bottom side opposite the top side, the paddle comprising at least one void, each void extending through the paddle from a bottom opening on the bottom side to a top opening on the top side, the paddle further comprising:
    a stainless steel base;
    a conductor, the conductor comprising a layer of metal; and
    a dielectric layer having a first section and a second section, the first section positioned between the conductor and the stainless steel base to overlap the stainless steel base, the second section extending beyond the stainless steel base to not overlap the stainless steel base,
    wherein the bottom side of the paddle is configured to connect to the terminal with electrically conductive adhesive to electrically connect the terminal to the conductor.

2. The DSA flexure of claim 1, wherein each void is sufficiently small to prevent wicking of the conductive adhesive through the at least one void to the top side.

3. The DSA flexure of claim 1, wherein the stainless steel base is electrically isolated from the conductor.

4. The DSA flexure of claim 1, wherein the stainless steel base forms a cavity on the bottom side of the flexure, the cavity located directly below the at least one void and providing an accessing opening to the at least one void.

5. The DSA flexure of claim 1, wherein the conductor comprises a contact pad, the at least one void extends through the contact pad, and the contact pad is electrically connected with a trace layer that extends along the DSA flexure.

6. The DSA flexure of claim 1, further comprising a conductive via extending through the dielectric layer to electrically connect the conductor to the stainless steel base, wherein the at least one void extends through the stainless steel base.

7. The DSA flexure of claim 6, wherein the conductor comprises a trace layer that extends along the DSA flexure.

8. The DSA flexure of claim 6, wherein the at least one void comprises a plurality of voids.

9. The DSA flexure of claim 8, wherein the stainless steel base comprises:
   a first surface on the top side of the paddle;
   a second surface on the bottom side of the paddle such that the first surface is opposite the second surface;
   a first plurality of depressions formed in the first surface in a first grid pattern; and
   a second plurality of depressions formed in the second surface in a second grid pattern,
   wherein the first grid pattern is offset with respect to the second grid pattern, and the first plurality of depressions connect with the second plurality of depressions to form the plurality of voids that extend from the bottom side to the top side of the paddle.

10. The DSA structure of claim 9, where each depression of the first plurality of depressions and the second plurality of depressions is spherically shaped.

11. A DSA flexure having a motor contact paddle for connecting to a terminal of a piezoelectric motor, the flexure comprising:
   a paddle comprising a top side and a bottom side opposite the top side, the paddle comprising:
   a metal base;
   a contact pad, the contact pad comprising a layer of metal, the contact pad comprising a first surface on the top side of the paddle, a second surface on the bottom side of the paddle opposite the first surface, and at least one void, each void extending through the contact pad from the first surface to the second surface and exposed on the top side;
   a dielectric layer positioned between the contact pad and the metal base; and
   a trace layer electrically connected to the contact pad, the trace layer extending along the DSA flexure,
   wherein the bottom side is configured to connect to the terminal with electrically conductive adhesive to electrically connect the trace layer to the terminal, and each void is sufficiently small to prevent wicking of conductive adhesive through the void to the first surface.

12. The DSA flexure of claim 11, wherein the stainless steel base is electrically isolated from the conductor.

13. The DSA flexure of claim 11, wherein the stainless steel base forms a cavity on the bottom side of the flexure, the cavity located directly below the at least one void and providing an accessing opening to the at least one void.

14. The DSA flexure of claim 11, wherein the layer of metal of the contact pad comprises a first material and a second material plated directly on the first material, wherein the first material comprises copper or copper alloy and the second material comprises one or both of gold and nickel.

15. The DSA flexure of claim 11, further including a dielectric cover coat layer extending along at least a portion of the top side, wherein the at least one void is exposed on the top side through the dielectric cover coat layer.

16. The DSA flexure of claim 11, wherein the dielectric layer extends along at least part of the second surface, and the at least one void is exposed on the bottom side through the dielectric layer.

17. The DSA flexure of claim 11, wherein the at least one void comprises only one void.

18. The DSA flexure of claim 11, wherein each of the at least one void comprises a circular hole through the contact pad.

19. The DSA flexure of claim 11, wherein each of the at least one void comprises an elongated slot in the contact pad.

20. A DSA flexure having a motor contact paddle for connecting to a terminal of a piezoelectric motor, the flexure comprising:
   a paddle comprising a top side and a bottom side opposite the top side, the paddle further comprising:
   a metal base comprising a first surface on the top side of the paddle, a second surface on the bottom side of the paddle opposite the second surface, and at least one void, each void extending through the metal base from the first surface to the second surface, the at least one void exposed on the top side;
   a trace layer that extends along the flexure and is electrically connected to the metal base; and
   a dielectric layer having a first section and a second section, the first section positioned between the trace layer and the metal base,
   wherein the bottom side is configured to connect to the terminal with electrically conductive adhesive to electrically connect the trace layer to the terminal.

21. The DSA flexure of claim 20, wherein the paddle further comprising a conductive via extending through the dielectric layer to electrically connect the trace layer to the metal base.

22. The DSA flexure of claim 20, wherein the metal base is formed from stainless steel.

23. The DSA flexure of claim 20, further comprising a metal plated directly on the second surface.

24. The DSA flexure of claim 23, wherein the metal is further plated directly on the first surface and on a third surface of the metal base and defines the at least one void.

25. The DSA flexure of claim 20, wherein the trace layer is disposed directly on the dielectric layer, and a section of the trace layer disposed directly on the dielectric layer extends beyond the metal base such that the section of the trace layer and the dielectric layer does not overlap with the metal base.

26. The DSA flexure of claim 20, wherein the at least one void comprises a plurality of voids.

27. A DSA flexure having a motor contact paddle for connecting to a terminal of a piezoelectric motor, the flexure comprising:
   a paddle comprising a top side and a bottom side opposite the top side, the paddle further comprising:
   a metal base comprising:
   a first surface on the top side of the paddle;
   a second surface on the bottom side of the paddle opposite the second surface;
   a first plurality of depressions formed in the first surface in a first grid pattern; and
   a second plurality of depressions formed in the second surface in a second grid pattern that is offset from the first grid pattern, the first plurality of depressions connecting with the second plurality of depressions to form a plurality of voids that extend from the bottom side to the top side; and a trace layer that extends along the flexure and is electrically connected to the metal base;

wherein the bottom side is configured to connect to the terminal with electrically conductive adhesive to electrically connect the terminal to the trace layer.

28. The DSA structure of claim 27, where each depression of the first plurality of depressions and the second plurality of depressions is spherically shaped.

29. The DSA flexure of claim 27, further comprising a metal plated directly on the second surface.

30. The DSA flexure of claim 27, further comprising a dielectric layer positioned between the trace layer and the metal base, wherein the paddle further comprises a conductive via extending through the dielectric layer to electrically connect the trace layer to the metal base.

* * * * *